(12) United States Patent
Cackett et al.

(10) Patent No.: US 6,669,580 B1
(45) Date of Patent: *Dec. 30, 2003

(54) GOLF CLUB HEAD THAT OPTIMIZES PRODUCTS OF INERTIA

(75) Inventors: Matthew T. Cackett, San Diego, CA (US); D. Clayton Evans, San Marcos, CA (US); Richard C. Helmstetter, Rancho Santa Fe, CA (US); Frank "Pin" H. Fan, Carlsbad, CA (US); Alan Hocknell, Encinitas, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/249,451

(22) Filed: Apr. 10, 2003

Related U.S. Application Data

(63) Continuation-in-part of application No. 10/064,572, filed on Jul. 26, 2002, now Pat. No. 6,547,676, which is a continuation of application No. 09/916,374, filed on Jul. 26, 2001, now Pat. No. 6,425,832, which is a continuation-in-part of application No. 09/796,951, filed on Feb. 27, 2001, now abandoned, which is a continuation-in-part of application No. 09/474,688, filed on Dec. 29, 1999, now Pat. No. 6,386,990, which is a continuation-in-part of application No. 08/958,723, filed on Oct. 23, 1997, now Pat. No. 6,010,411.

(51) Int. Cl.[7] ............................................. A63B 53/04
(52) U.S. Cl. .................... 473/345; 473/348; 473/349
(58) Field of Search ............................. 473/345, 348, 473/349

(56) References Cited

U.S. PATENT DOCUMENTS

| | | | |
|---|---|---|---|
| 3,941,390 A | 3/1976 | Hussey | |
| 4,575,447 A | 3/1986 | Hariguchi | |
| 5,309,753 A | 5/1994 | Johnson | |
| 5,351,953 A | 10/1994 | Mase | |
| 5,377,985 A | 1/1995 | Ohnishi | |
| 5,485,998 A | 1/1996 | Kobayashi | |
| 5,628,698 A | 5/1997 | Sumitomo | |
| 5,836,830 A | 11/1998 | Onuki et al. | |
| 5,877,970 A | 3/1999 | Nesbit et al. | |
| 5,971,867 A | 10/1999 | Galy | |
| 6,010,411 A | 1/2000 | Reyes | |
| 6,045,455 A | * 4/2000 | Kosmatka et al. | 473/291 |
| 6,102,813 A | 8/2000 | Dill | |
| 6,123,627 A | 9/2000 | Antonius | |
| 6,186,905 B1 | 2/2001 | Kosmatka | |
| 6,244,976 B1 | 6/2001 | Murphy | |
| 6,248,025 B1 | 6/2001 | Murphy | |
| 6,364,788 B1 | 4/2002 | Helmstetter | |

FOREIGN PATENT DOCUMENTS

EP       377 673 BU       7/1988

OTHER PUBLICATIONS

McGill, David J. and King, Wilton, W., Engineering Mechanics, Statics, 3rd Ed., 1995.
Meirovitch, Leonard, Methods of Analytical Dynamics, 1970.

(List continued on next page.)

*Primary Examiner*—Stephen Blau
(74) *Attorney, Agent, or Firm*—Michael A. Catania; Elaine H. Lo

(57) ABSTRACT

A golf club having products of inertia Ixy and Ixz with absolute values below 100 g-cm$^2$ and a positive product of inertia Iyz is disclosed herein. The golf club has a large volume, a high moment of inertia, or both. Preferably, the moment of inertia, Izz, of the golf club head about a vertical axis Z through the center of gravity ranges from 3000 g-cm$^2$ to 5000 g-cm$^2$, and a moment of inertia, Iyy, about a horizontal axis Y through the center of gravity of the golf club head is greater than 1900 g-cm$^2$. The golf club head may be composed of plies of pre-preg sheets. The volume of the golf club head preferably ranges from 300 cm$^3$ to 600 cm$^3$.

17 Claims, 24 Drawing Sheets

OTHER PUBLICATIONS

Kane, Thomas R. and Levinson, David A., Dynamics, Theory and Applications 1985.

Greenwood, Donald T., Principles of Dynamics, 1965.

Meriam, J.L., & Kraige, L.G., Dynamics, 4th, Engineering Mechanics, vol 2 1997.

Hibbeler, R.C., Engineering Mechanics, Dynamics, 8th. Ed. 1997.

Shames, Irvine H., Engineering Mechanics, 4th. Ed., 1996.

Griffiths, J.B., The Theory of Classical Dynamics, 1965.

Experimental determination of inertia ellipsoids, Johnson, S..H., Lehigh University, Bethlehem, PA 1994.

Determining the central principal inertia dyadic of a golf club head. Twigg, M.J., and Butler, J.H. Experimental Techniques, Sep./Oct. 1996.

* cited by examiner

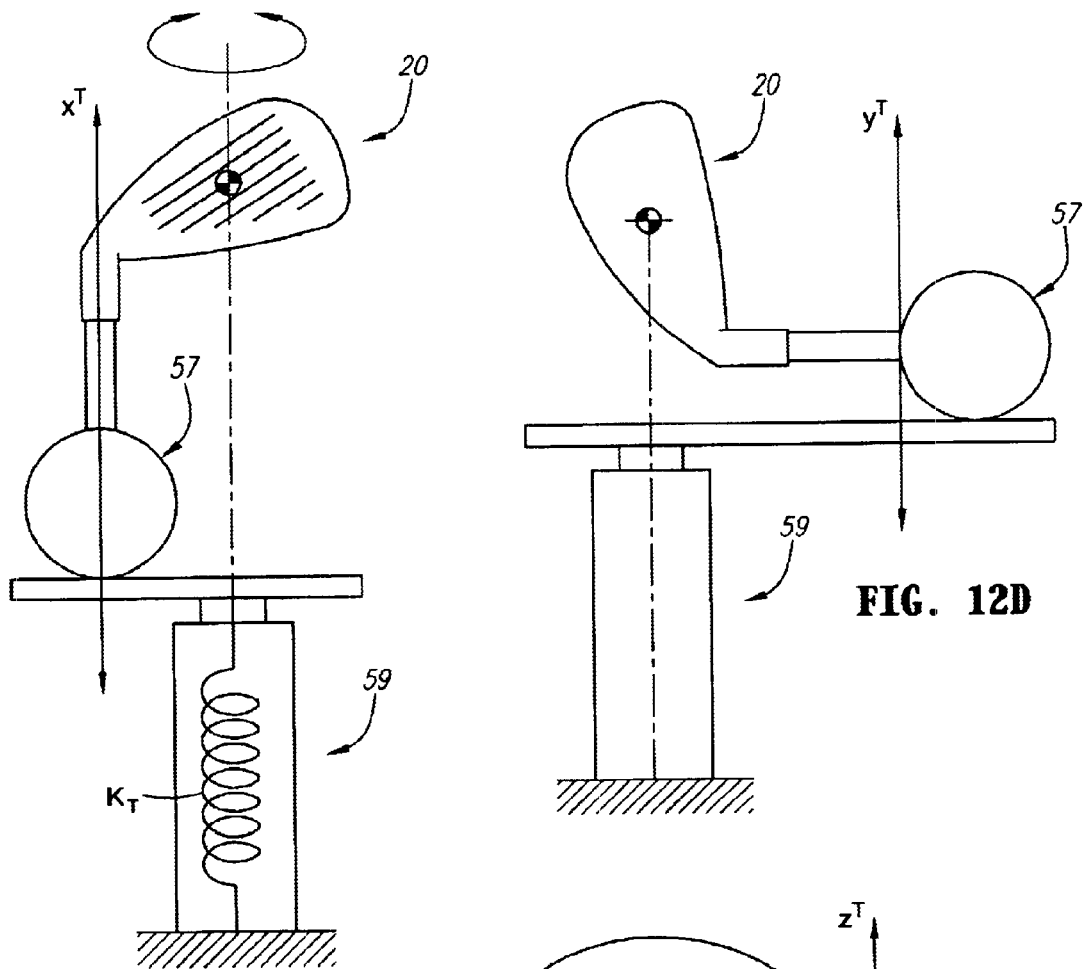
FIG. 12C
FIG. 12D
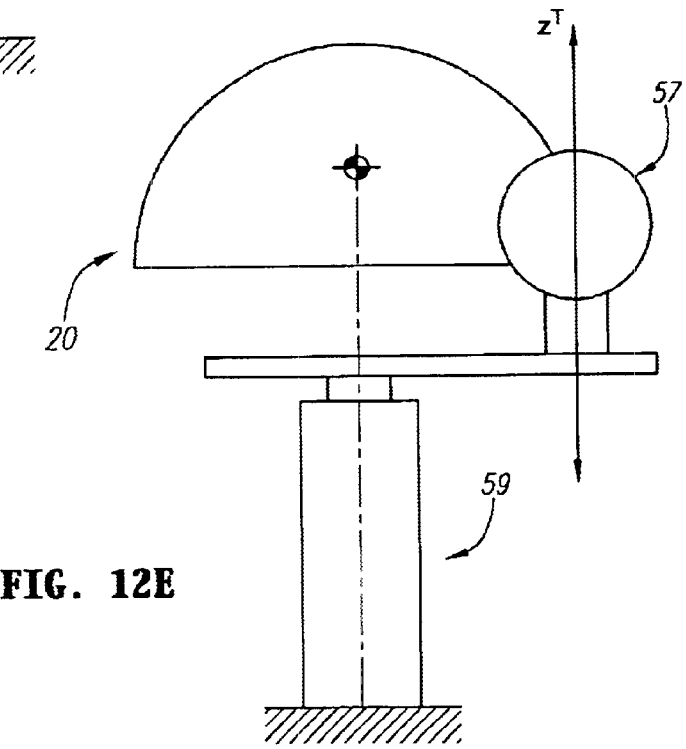
FIG. 12E

Change in dispersion (ft) per 100g·cm² increase in Iyz

Change in dispersion (ft)
per 100g·cm² increase in Iyz

Change in distance (yd) per 100g·cm² increase in lyz

Change in distance (yd)
per 100g·cm² increase in Ixy

Change in dispersion (ft) per 100g·cm² increase in Ixy

Change in distance (yd)
per 100g·cm² increase in Ixz

Change in dispersion (ft) per 100g·cm² increase in Ixz

GOLF CLUB HEAD THAT OPTIMIZES PRODUCTS OF INERTIA

CROSS REFERENCE TO RELATED APPLICATIONS

This application is a continuation-in-part of U.S. patent application Ser. No. 10/064,572, filed on Jul. 26, 2002, now U.S. Pat. No. 6,547,676, which is a continuation of U.S. patent application Ser. No. 09/916,374, filed on Jul. 26, 2001, now U.S. Pat. No. 6,425,832, which is a continuation-in-part application of U.S. patent application Ser. No. 09/796,951, filed on Feb. 27, 2001 now abandoned, which is a continuation-in-part application of U.S. patent application Ser. No. 09/474,688, filed on Dec. 29, 1999, now U.S. Pat. No. 6,386,990, which is a continuation-in-pan application of U.S. patent application Ser. No. 08/958,723, filed on Oct. 23, 1997, and now U.S. Pat. No. 6,010,411, all of which are hereby incorporated by reference in their entirety.

FEDERAL RESEARCH STATEMENT

Not Applicable

BACKGROUND OF INVENTION

1. Field of the Invention

The present invention relates to a large volume golf club head that optimizes the products of moments of inertia. More specifically, the present invention relates to a large volume golf club head that has large moments of inertia with smaller absolute values for the products of inertia.

2. Description of the Related Art

In recent years, substantial attention has been directed toward the development of golf club heads having desired weight characteristics and, in particular, toward the development of golf club heads having a desired center of gravity location. For example, a designer may want to locate the center of gravity of a golf club head in a predetermined or preferred position relative to the face or "sweet spot" of the golf club head to provide greater distance.

Because conventional golf club heads are typically made from metal alloys or other materials having a subhomogeneous density, the weight characteristics of such golf club heads are typically defined by their overall shape. Thus, to alter the location of the center of gravity of a golf club head, it is often necessary to redesign the shape or configuration of the golf club head. However, this may adversely impact other desired characteristics of the golf club head.

The design process may be further complicated where golf club heads are manufactured using composite materials (typically carbon reinforced plastic). Because composite materials are typically less dense than metal and other conventional materials, composite golf club heads generally require additional weighting to achieve desired swing weights for finished golf clubs.

The Rules of Golf, established and interpreted by the United States Golf Association ("USGA") and The Royal and Ancient Golf Club of Saint Andrews, set forth certain requirements for a golf club head. The requirements for a golf club head are found in Rule 4 and Appendix II. A complete description of the Rules of Golf are available on the USGA web page at www.usga.org. Although the Rules of Golf do not expressly state specific parameters for a golf club, Rule 4-1 d states that the club head shall be generally plain in shape, and all parts shall be rigid, structural in nature and functional.

In the past few years, the volume of drivers and fairway woods have increased to provide greater forgiveness for golfers. The BIG BERTHA® driver from Callaway Golf Company of Carlsbad, Calif., at 195 cubic centimeters (cc) was the beginning of the large volume drivers. The BIG BERTHA® stainless steel driver was followed by the GREAT BIG BERTHA® titanium driver, also from the Callaway Golf Company, which had a volume of 250 cc. Then, the BIGGEST BIG BERTHA® titanium driver was introduced by the Callaway Golf Company, which had a volume of 295 cc. Recently, the forged titanium ERC® driver was introduced by the Callaway Golf Company, which had a volume of 300 cc. These large volume drivers have greater moments of inertia than previous golf clubs partly due to their size, and the desire to locate the center of gravity in a favorable position. It was believed that increasing the moments of inertia, Ixx, Izz and Iyy, of a driver would make the driver more forgiving. However, forgiveness, in the form of reduced dispersion is not a function of the moments of inertia, but rather a result of the products of inertia, Ixy, Ixz and Iyz.

The products of inertia relate moments about one axis with head rotations about another axis. These head rotations in turn cause vertical or horizontal gear effect that impart increased or reduced backspin and draw or fade spin to a golf ball. Unlike the spins generated by conventional gear effect associated with Iyy and Izz, these spins cannot be compensated for by adjusting the face bulge radius and the face roll radius. As club heads become larger than 300 cc, and moments of inertia become larger, Izz greater than 3000 grams centimeter squared and Iyy greater than 1800 grams, there is a propensity for the products of inertia to also become larger. As the products of inertia become larger, there is a deleterious effect on dispersion.

Thus, there is a need for a large volume golf club head with large moments of inertia, that have smaller products of inertia. This need is difficult to meet since large products of inertia are by-products of large moments of inertia.

SUMMARY OF INVENTION

The present invention provides a large volume golf club head with high moments of inertia that has smaller products of inertia. The golf club head of the present invention provides all of the advantages of large volume golf club heads with large moments of inertia, such as greater confidence and greater distance, without the attendant increase in dispersion. Thus, off-center hits have greater distance and increased straightness with the golf club head of the present invention, which results in more consistent golf ball flight and improved accuracy for the golfer.

One aspect of the present invention is a golf club head including a body having a crown, a sole and a striking plate. The body has a hollow interior. The golf club head has a moment of inertia, Izz, about a vertical axis Z through the center of gravity of the golf club head that is greater than 3000 g-cm². The golf club head also has a moment of inertia, Iyy, about the horizontal axis Y through the center of gravity of the golf club head that is greater than 1900 g-cm². Each of the products inertia, Ixy and Ixz, of the golf club head has an absolute value less than 100 g-cm², and the product of inertia Iyz is greater than 0 g-cm².

Another aspect of the present invention is a golf club head having a body composed of a titanium, titanium alloy, steel, stainless steel, or amorphous material. The body has a crown, a sole, a ribbon, a striking plate and a hollow interior. The golf club head has a volume ranging from 300 cm³ to 600 cm³. At least one weight member is disposed within the hollow interior of the body along the ribbon. The golf club head has a moment of inertia, Izz, about a vertical axis Z through the center of gravity of the golf club head that ranges from 3000 g-cm² to 5000 g-cm². The golf club head has a moment of inertia, Iyy, about the horizontal axis Y through the center of gravity of the golf club head that is at least 1900 g-cm². Each of the products inertia, Ixy and Ixz, of the golf club head has an absolute value less than 100 g-cm², and the product of inertia Iyz ranges from 0 g-cm² to 300 g-cm².

Having briefly described the present invention, the above and further objects, features and advantages thereof will be recognized by those skilled in the pertinent art from the following detailed description of the invention when taken in conjunction with the accompanying drawings.

BRIEF DESCRIPTION OF DRAWINGS

FIG. 12C is an Inertia Dynamic Moment of Inertia Machine for a golf club head of the present invention and illustrates distance from the head to spin axis in the $X^T$ direction.

FIG. 12D is an Inertia Dynamic Moment of Inertia Machine for a golf club head of the present invention and illustrates distance from the head to the spin axis in the $Y^T$ direction.

FIG. 12E is an Inertia Dynamic Moment of Inertia Machine for a golf club head of the present invention and illustrates distance from the head to the spin axis in the $Z^T$ direction.

DETAILED DESCRIPTION

Figure 1:
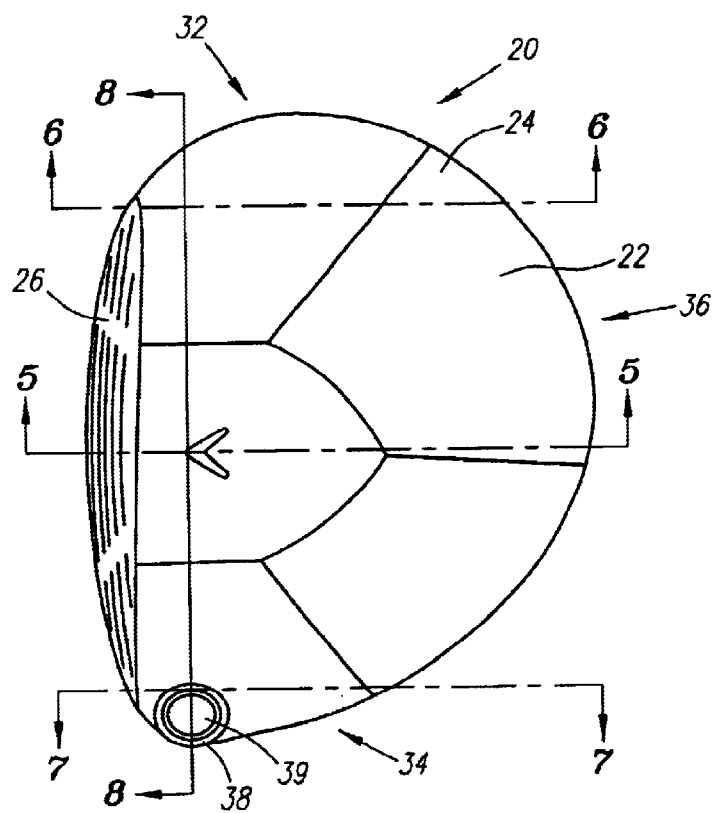
FIG. 1 is a top plan view of a golf club head of the present invention.
Figure 2:
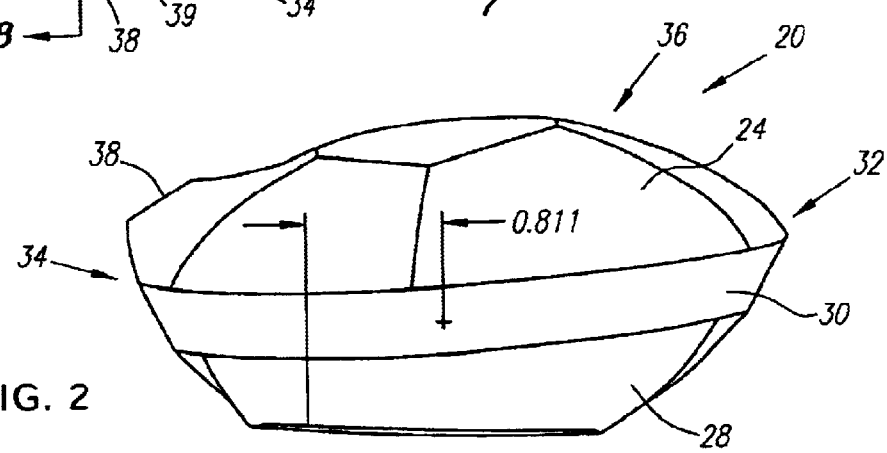
FIG. 2 is a rear view of the golf club head of FIG. 1.
Figure 3:
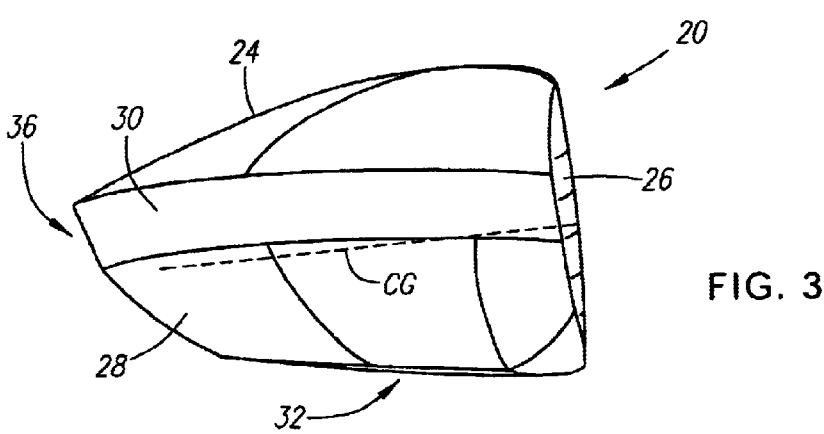
FIG. 3 is a toe end view of the golf club head of FIG. 1.
Figure 4:
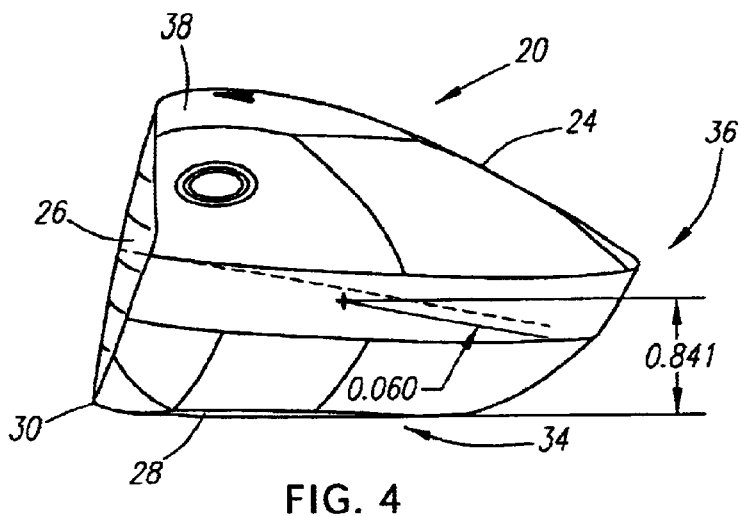
FIG. 4 is a heel end view of the golf club head of FIG. 1.

As shown in FIGS. 1–4, a golf club head of the present invention is generally designated 20. At least two of the products of inertia (Ixy and Ixz) of the golf club head have an absolute value below 100 g-cm$^2$, while the third product of inertia, Iyz, is positive. Preferably, the absolute value of the products of inertia Ixy and Ixz is less than 50 g-cm$^2$, and most preferably the absolute value of the products of inertia Ixy and Ixz approaches zero. The product of inertia Iyz is preferably between 0 g-cm$^2$ and 300 g-cm$^2$, and most preferably between 50 g-cm$^2$ and 200 g-cm$^2$. The moment of inertia, Izz, about the Z axis for the golf club head 20 of the present invention will range from 2800 g-cm$^2$ to 5000 g-cm$^2$, preferably from 3000 g-cm$^2$ to 4500 g-cm$^2$, and most preferably from 3500 g-cm$^2$ to 4000 g-cm$^2$. The moment of inertia, Iyy, about the Y axis for the golf club head 20 of the present invention will range from 1500 g-cm$^2$ to 2500 g-cm$^2$, preferably from 1800 g-cm$^2$ to 2100 g-cm$^2$, and most preferably from 1900 g-cm$^2$ to 2050 g-cm$^2$. The golf club head 20 will preferably have a volume ranging from 300 cubic centimeters ("cc") to 600 cc, and more preferably from 325 cc to 525 cc.

The club head 20 is preferably a driver or fairway wood. In a preferred embodiment, the body 22 has a crown 24, a face 26, a sole 28 and a ribbon 30 juxtaposed by the sole 28 and the crown 24. The ribbon 30 generally extends from a toe end 32 to a heel end 34. The ribbon 30 generally begins at one end of the face 26 and ends at an opposite end of the face 26. A rear 36 of the body 22 is opposite the face 26 and is defined by portions of the ribbon 30, the crown 24 and the sole 28. The ribbon 30 increases the volume of the club head 20 and also assists in creating a club head 20 with a higher moment of inertia as described in greater detail below. Also, at the heel end 34 of the club head 20 is an internal hosel 38 with a shaft opening 39 for insertion of a shaft therein.

The body 22 is composed of metals, composite materials, plastic materials and the like. In a preferred embodiment, the body 22 is composed of a plies of carbon pre-preg (pre-impregnated) sheets, or a similar non-metallic material. In an alternative embodiment, the body 22 is composed of a forged titanium alloy material. In another alternative embodiment, the body is composed of a forged steel material. In yet another alternative embodiment, the body 22 is composed of a cast titanium alloy material. Those skilled in the art will recognize that the body 22 may be composed of other materials without departing from the scope and spirit of the present invention.

The body 22 preferably has a hollow interior 44 defined by the walls of the crown 24, face 26, sole 28 and ribbon 30. The walls of the crown 24, sole 28 and ribbon 30 are relatively thin in order to minimize mass. The thickness of the wall of the face 26 is thicker than the other walls due to the necessity to sustain impact with a golf ball. If the face 26 is composed of a metal material, it preferably has variable thickness such as disclosed in U.S. Pat. No. 5,830,084 which is hereby incorporated by reference in its entirety.

Figure 5:
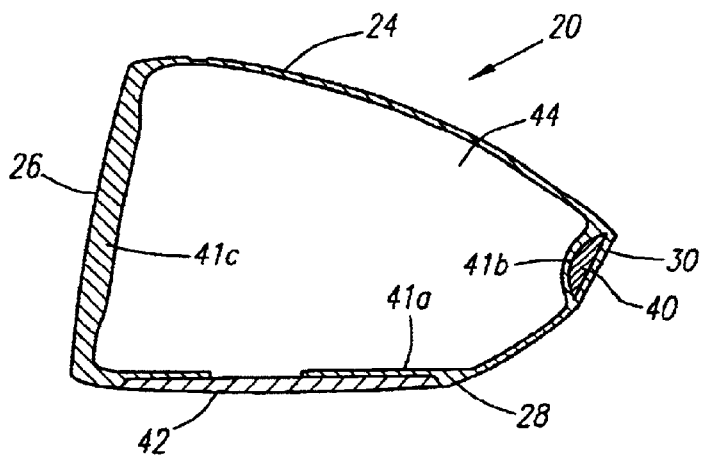
FIG. 5 is a cross-sectional view of the golf club head of FIG. 1 along line 5—5.
Figure 6:
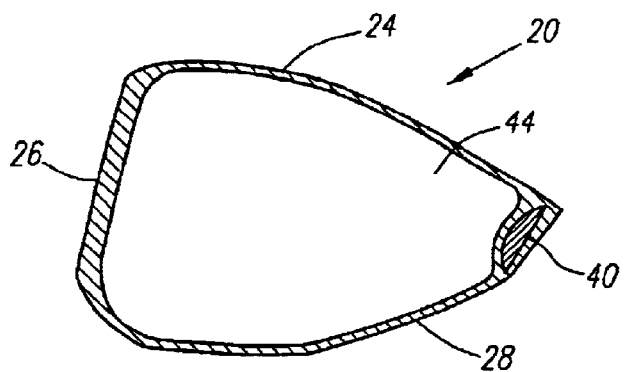
FIG. 6 is a cross-sectional view of the golf club head of FIG. 1 along line 6—6.
Figure 7:
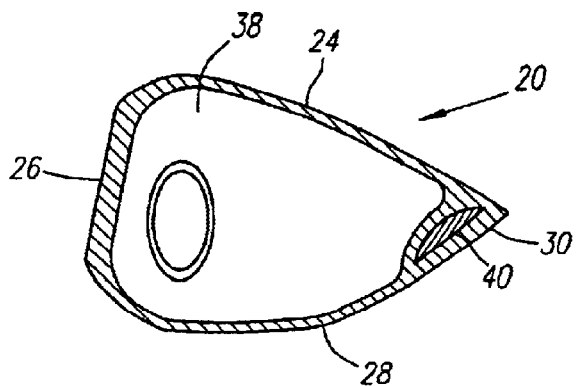
FIG. 7 is a cross-sectional view of the golf club head of FIG. 1 along line 7—7.

As shown in FIGS. 5–7, the club head 20 has a plurality of weight members 40 disposed in the hollow interior 44 of the club head 20. The weight members 40 are positioned for location of the center of gravity, to increase the moments of inertia and to minimize the products of inertia. In a preferred embodiment, the weight members 40 are preferably embedded within layers of the plies of pre-preg as described in greater detail below. In an alternative embodiment, such as a body composed of a metal material, each of the weight members 40 is a weight compartment composed of the same material as the sole 29 for welding thereto. The weight compartment defines a chamber of a predetermined volume with a material disposed therein having a density of seven to twenty grams/cubic centimeters and weighing between three to seventy grams (bismuth is one such material). Such a weight member 40 is disclosed in U.S. Pat. No. 6,364,788, filed on Aug. 4, 2000, entitled Weighting System For Golf Club Head, which is hereby incorporated by reference in its entirety. In other embodiments, the weight member is a tungsten screw that is threadingly engaged into the body 22 at the proper position, or a weight chip welded to the body 22. Those skilled within the pertinent art will recognize that other means of weighting may be utilized without departing from the scope and spirit of the present invention.

Figure 8:
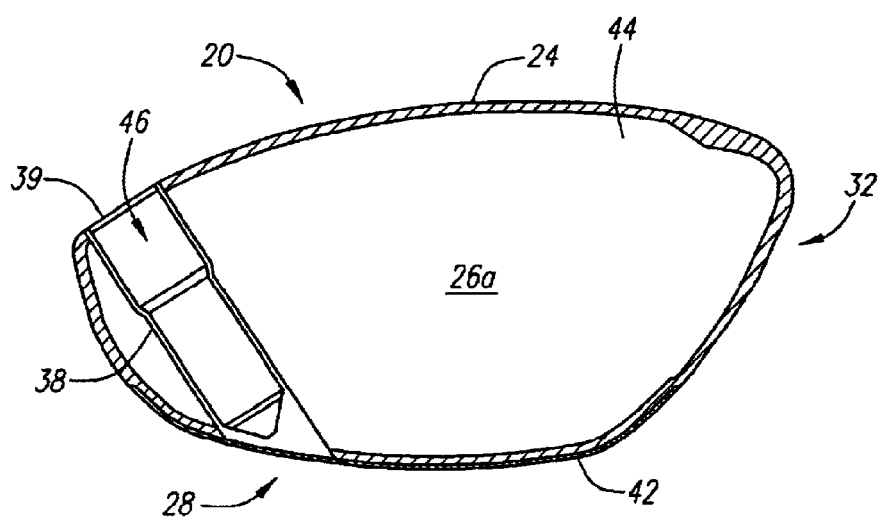
FIG. 8 is a cross-sectional view of the golf club head of FIG. 1 along line 8—8.
Figure 8A:
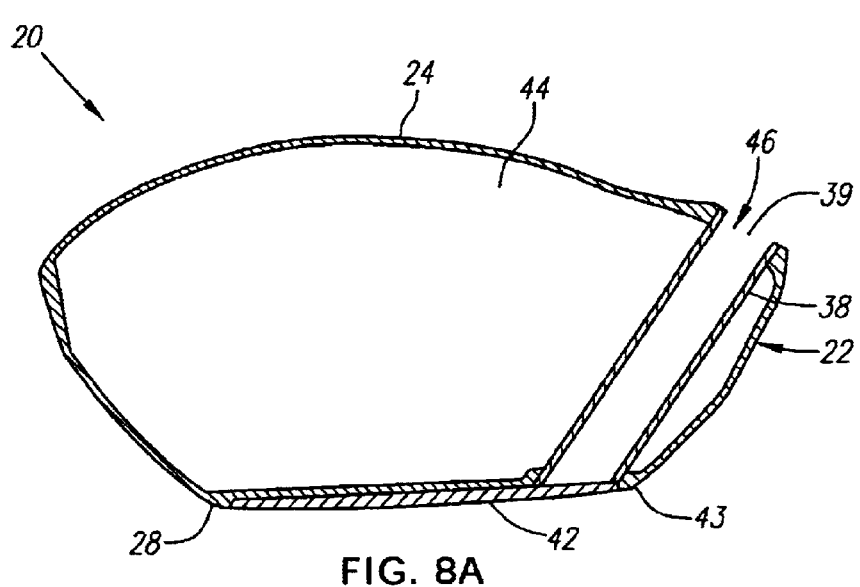
FIG. 8A is a cross-sectional view of the golf club head of an alternative embodiment with a sole plate having an attached hosel.

As shown in FIG. 8, the sole plate 42 is attached to the exterior surface of the sole 28 and a hosel 38 is positioned within the hollow interior 44 of the club head 20. The sole plate 42 is preferably composed of a metal such as aluminum, titanium or stainless steel. The sole plate 42 weighs approximately 5 grams to 15 grams. The hosel 38 is preferably composed of a metal such as stainless steel, or a polycarbonate material. The hosel 38 preferably weighs 12 to 16 grams. Another embodiment, shown in FIG. 8A, has an integral sole plate and hosel such as described in U.S. Pat. No. 6,244,976, filed on Dec. 29, 1999, and entitled Integral Sole Plate And Hosel For A Golf Club Head, which is hereby incorporated by reference in its entirety. Those skilled in the pertinent art will recognize that the hosel may be an external hosel that extends upward from the heel end of a golf club head, and that such an external hosel would have an effect on the products of inertia.

The weight members 40 are preferably composed of a film loaded with a high density metal (like tungsten), or a metal material such as copper, tungsten, steel, aluminum, tin, silver, gold, platinum, or the like. A preferred weight member 40 is a thermoplastic material filled with a metal to an appropriate density, and the metal filler may be tungsten, brass, copper, steel, tin, or the like. Each weight member 40 has a density greater than the material of the body 22. Each weight strip 40 individually weighs approximately 3 grams to 35 grams, and more preferably from 10 grams to 30 grams. In a preferred embodiment, the total combined weight of all of the weight members 40 is approximately 30 grams to 80 grams, and most preferably 60 grams.

Figure 9:
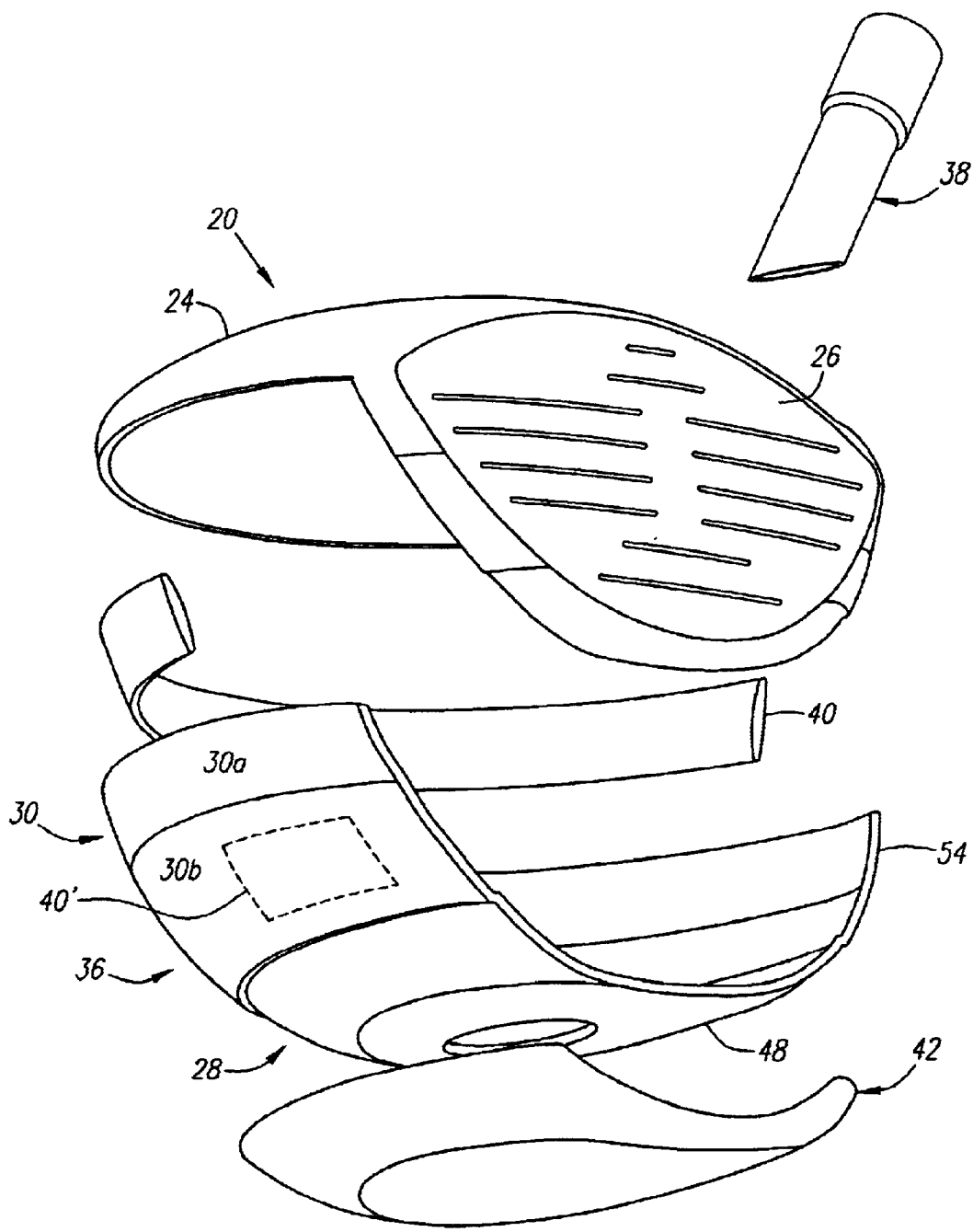
FIG. 9 is an exploded view of the golf club head of the present invention.

As shown in FIG. 9, preferably one weight member 40 is positioned in the upper ribbon 30a in a U-like arrangement to increase the moment of inertia of the golf club head 20. A second balancing weight member 40' is positioned in the lower ribbon 30b at the toe end 32 of the golf club head 20 to balance the internal hosel 38 in order to reduce the products of inertia of the golf club head 20 below 100 g-cm$^2$. The weight member 40 in the upper ribbon 30a extends from approximately the heel end 34 of the face 26 through the rear 36 to the toe end 32 of the face 26. However, this weight member 40 may only extend along the rear 36 of the upper ribbon 30a, the heel end 34 of the upper ribbon 30a, the toe end 32 of the upper ribbon 30a, or any combination thereof. The balancing weight member 40' in the lower ribbon section 30b preferably matches the moment of inertia effect of the internal hosel 38.

Figure 9A:
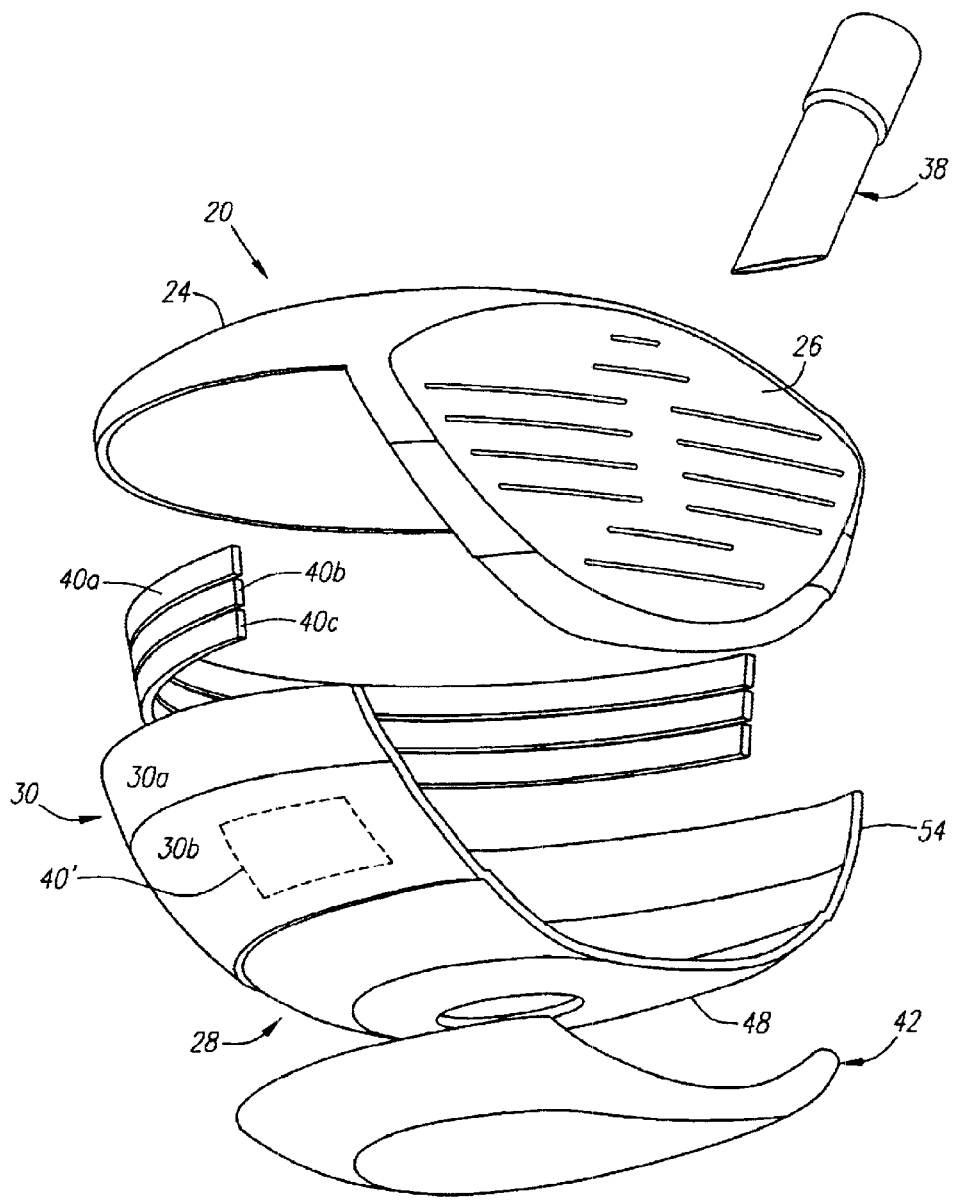
FIG. 9A is an exploded view of another alternative embodiment of the golf club head of the present invention.
Figure 9B:
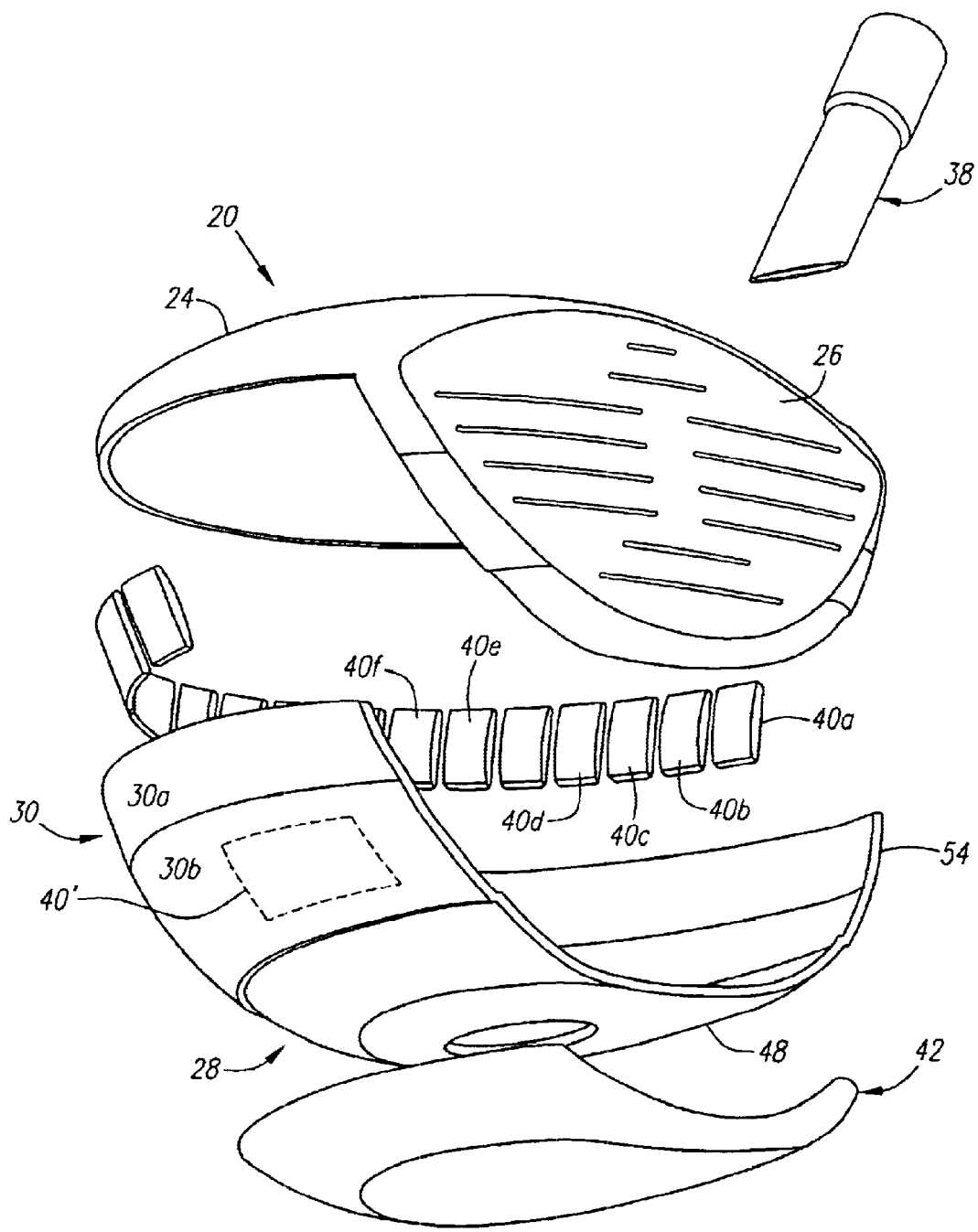
FIG. 9B is an exploded view of yet another alternative embodiment of the golf club head of the present invention.
Figure 9C:
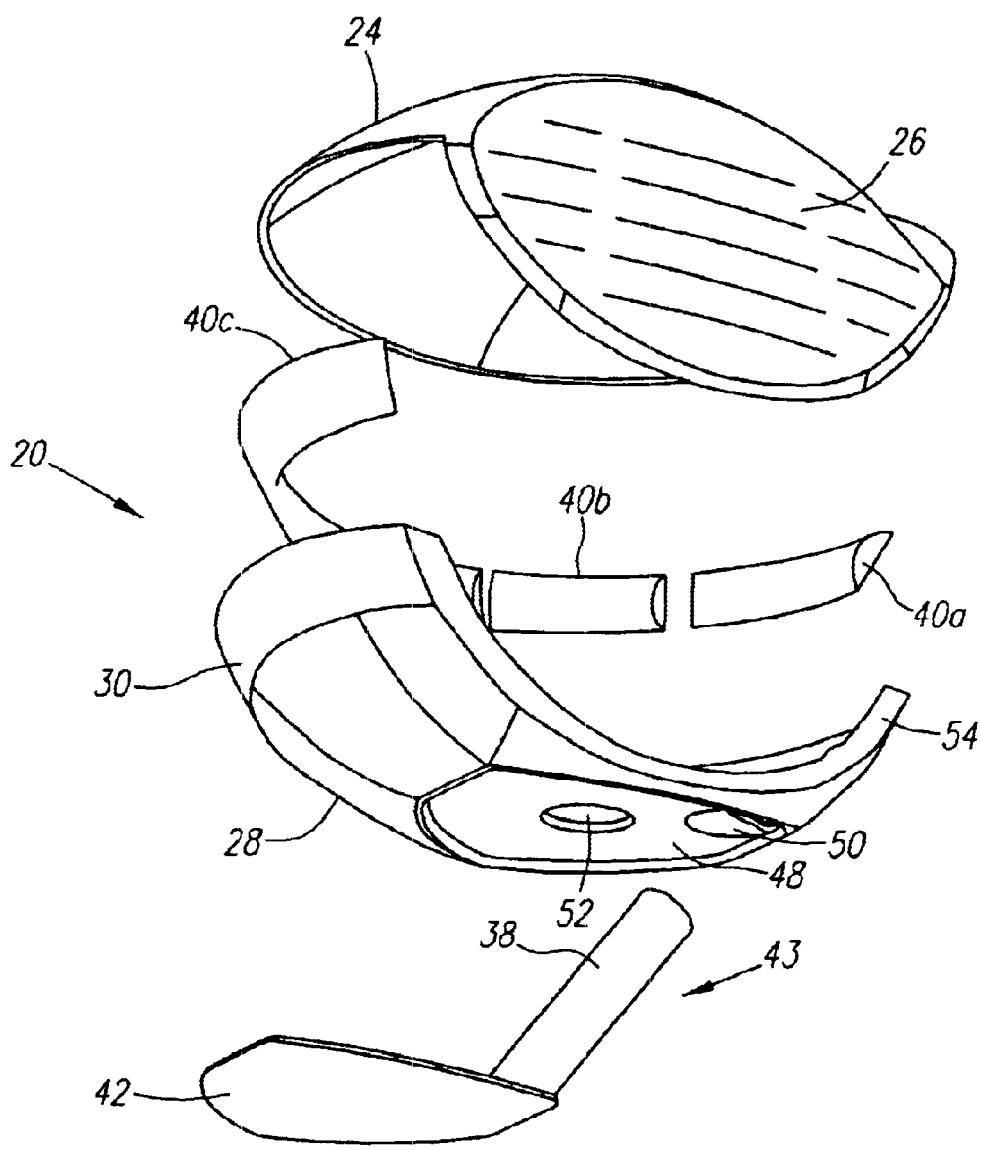
FIG. 9C is an exploded view of an alternative embodiment of the golf club head of the present invention.

In a preferred embodiment with a body 22 composed of a composite material, the weight member 40 is a single piece co-cured to the upper ribbon 30a. However, two, three, four, or more weight members 40 may be co-cured and extend along a portion of the upper ribbon 30a. The multiple weight members 40 may be partitioned horizontally or vertically. For example, as shown in FIG. 9A, three separate weight members 40a–c are parallel to each other and extend along substantially the entire length of the upper ribbon 30a. In an alternative embodiment as shown in FIG. 9B, multiple weight members 40a–j are evenly distributed along the entire length of the upper ribbon 30a. In yet another alternative embodiment shown in FIG. 9C, three separate weight members 40a–c are positioned in the toe end 32 of the ribbon 30, the rear 36 of the ribbon 30, and the heel end 32 of the ribbon 30. This embodiment does not have a balancing weight member 40', however, the weight members 40a–c vary in weight in order to provide a golf club head 20 with absolute values for the products of inertia Ixy and Ixz below 100 g-cm$^2$ and a positive product of inertia Iyz. Those skilled in the pertinent art will recognize that numerous variations for the weight members 40 are possible without departing from the scope and spirit of the present invention.

As previously stated, the preferred composite material is plies of carbon pre-preg sheets. Plies of pre-preg composite sheets are manufactured by pulling strands of fiber in a parallel motion, preferably carbon or glass fiber, through a resin film and allowing the resin to partially cure or "stage".

When the resin is partially staged, the resin holds the fibers together such that the fibers form a malleable sheet with all of the fibers in a specific orientation relative to an edge of the sheet. Exemplary carbon pre-preg fiber sheets may be obtained from Newport Composites of Santa Ana, Calif., Cytec Inc. of Anaheim, Calif., or Hexcel Inc. of Pleasonton, Calif. Alternatively, the layers 41a–c of the composite body 22 may comprise a plurality of plies of composite fiber without any resin, each typically comprising a continuous fiber braid or mat, that are used to make a dry reinforcement preform, as described in U.S. Pat. No. 6,010,411 filed on Oct. 23, 1997, which is hereby incorporated by reference in its entirety.

The composite body 22 may include one or more plies of pre-preg that define structurally the various walls of the golf club head 20. Numerous other configurations may, of course, be utilized depending upon the desired structural characteristics of the golf club head 20. One such configuration is set forth in U.S. Pat. No. 6,248,025, filed on Dec. 29, 1999, entitled Composite Golf Club Head And Manufacturing Method, which is hereby incorporated by reference in its entirety.

Figure 10:
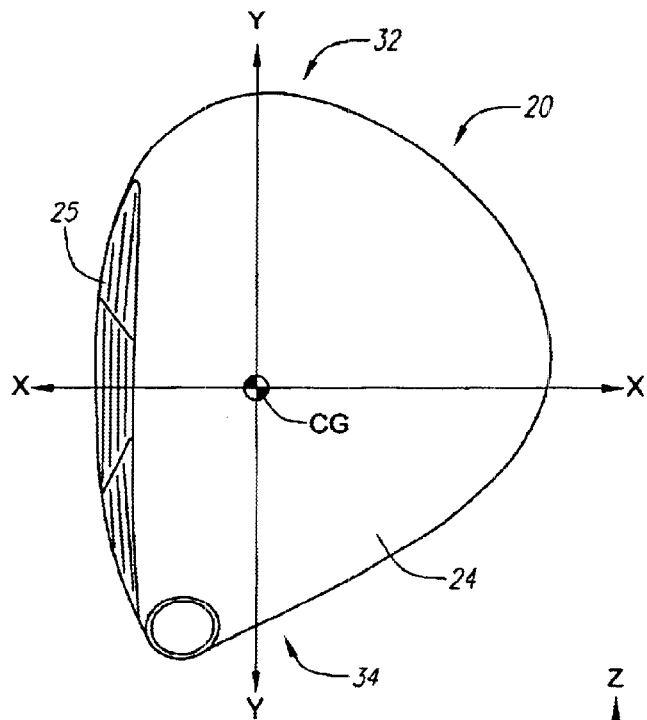
FIG. 10 is a top plan view of a golf club of the present invention illustrating the Y axis and X axis.
Figure 10A:
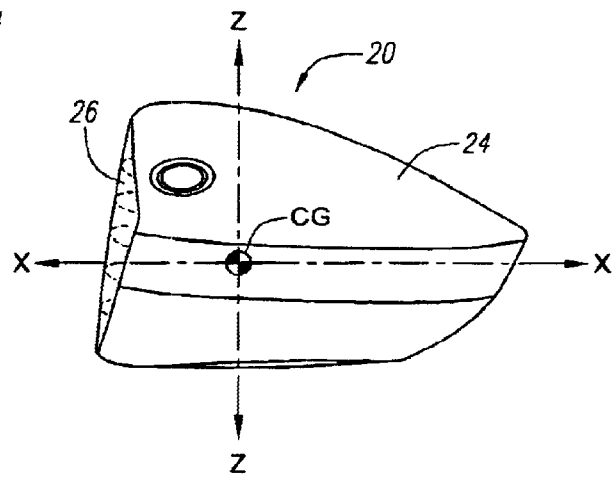
FIG. 10A is a heel side plan view of a golf club of the present invention illustrating the Z axis and X axis.
Figure 10B:
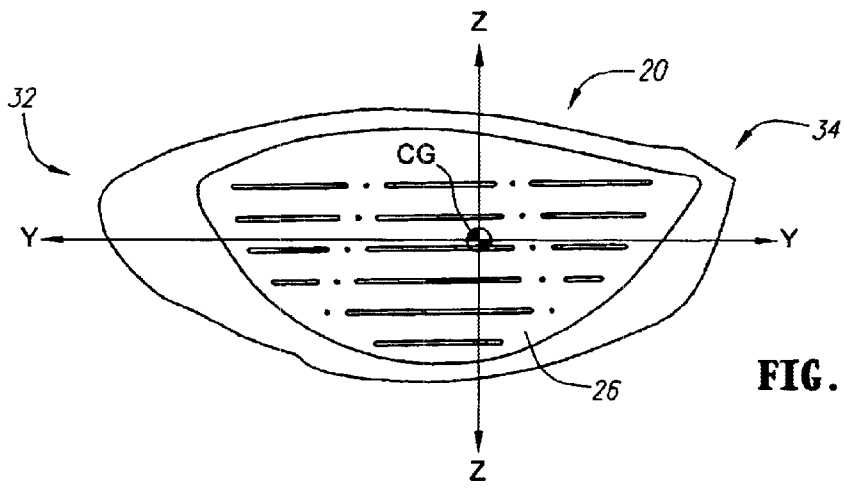
FIG. 10B is a front plan view of a golf club of the present invention illustrating the Z axis and Y axis.

FIGS. 10, 10A and 10B illustrate the axes of inertia through the center of gravity of the golf club head. The axes of inertia are designated X, Y and Z. The forward to rearward X axis extends from the striking plate 26 through the center of gravity, CG, and to the rear of the golf club head 20. The horizontal Y axis extends substantially parallel to the face 26 from the toe end 32 of the golf club head 20 through the center of gravity, CG, and to the heel end 34 of the golf club head 20. The vertical Z axis extends from the crown 24 through the center of gravity, CG, and to the sole 28. The X axis, the Y axis and the Z-axis are orthogonal to each other.

As defined in *Golf Club Design, Fitting, Alteration & Repair*, 4$^{th}$ Edition, by Ralph Maltby, the center of gravity, or center of mass, of the golf club head is a point inside of the club head determined by the vertical intersection of two or more points where the club head balances when suspended. A more thorough explanation of this definition of the center of gravity is provided in *Golf Club Design, Fitting, Alteration & Repair*.

Figure 11:
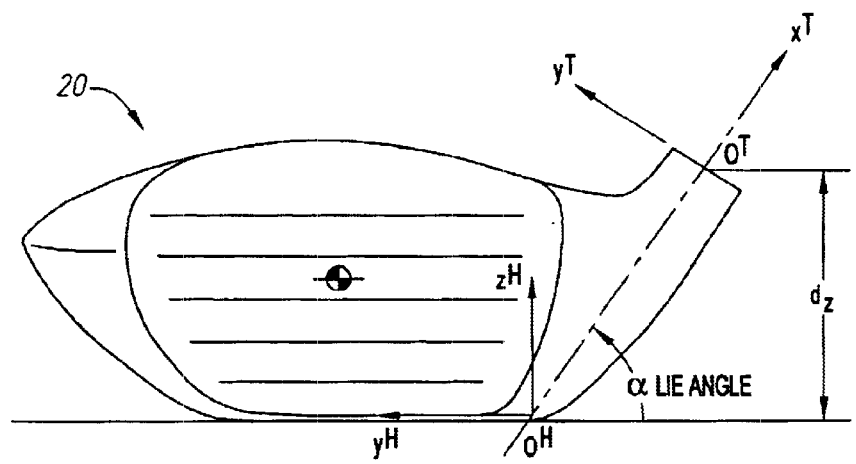
FIG. 11 is a front plan view of a golf club of the present invention illustrating the test frame coordinates $X^T$ and $Y^T$ and transformed head frame coordinates $Y^H$ and $Z^H$.
Figure 11A:
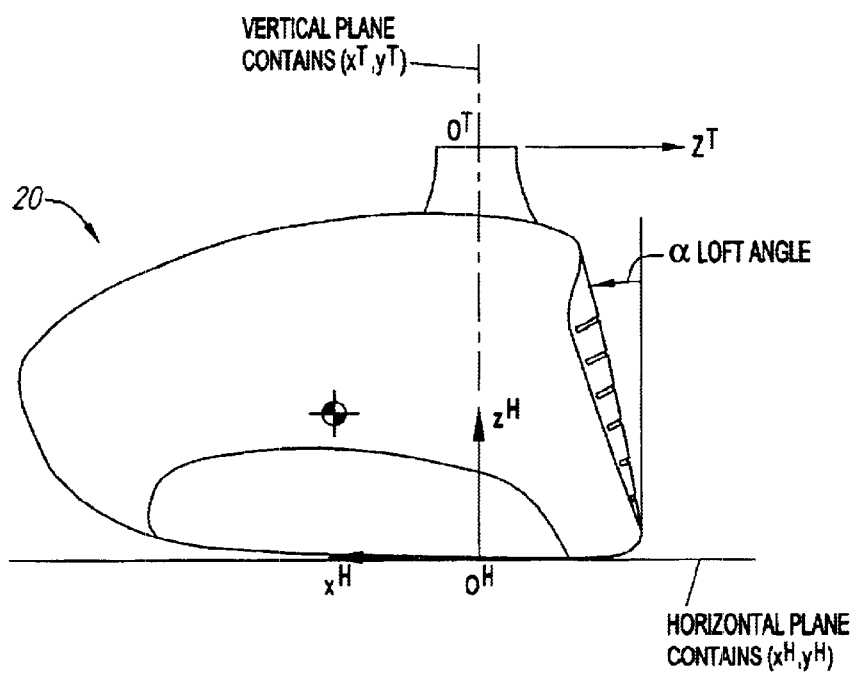
FIG. 11A is a toe end view of the golf club of the present invention illustrating the test frame coordinate $Z^T$ and transformed head frame coordinates $X^H$ and $Z^H$.
Figure 12:
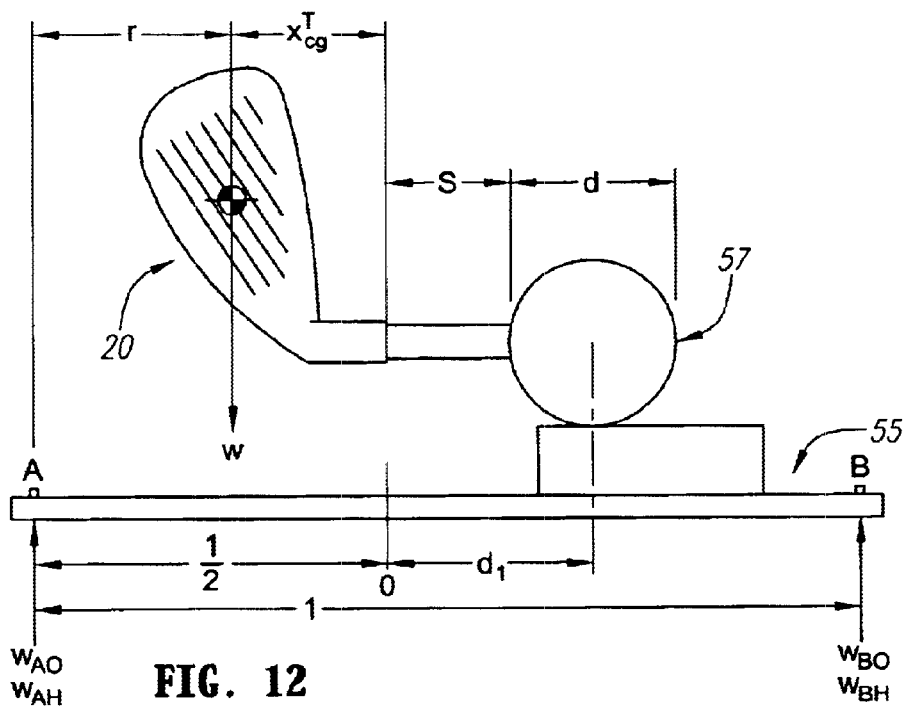
FIG. 12 is an illustration of a center of gravity table for a golf club head of the present invention used to measure the center of gravity along the X axis.
Figure 12A:
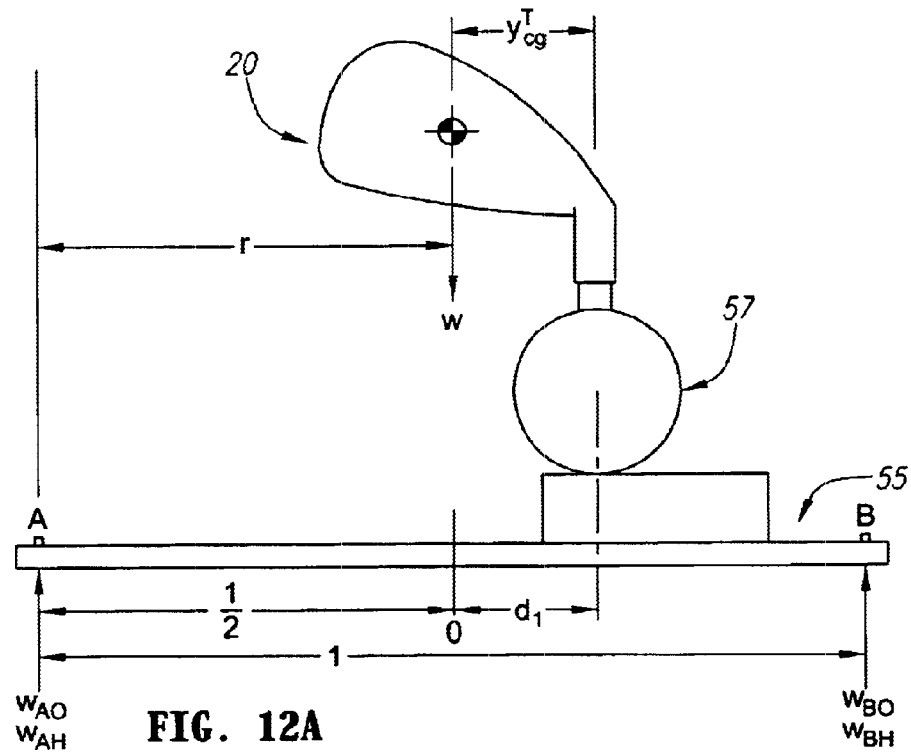
FIG. 12A is an illustration of a center of gravity table for a golf club head of the present invention used to measure the center of gravity along the Y axis.
Figure 12B:
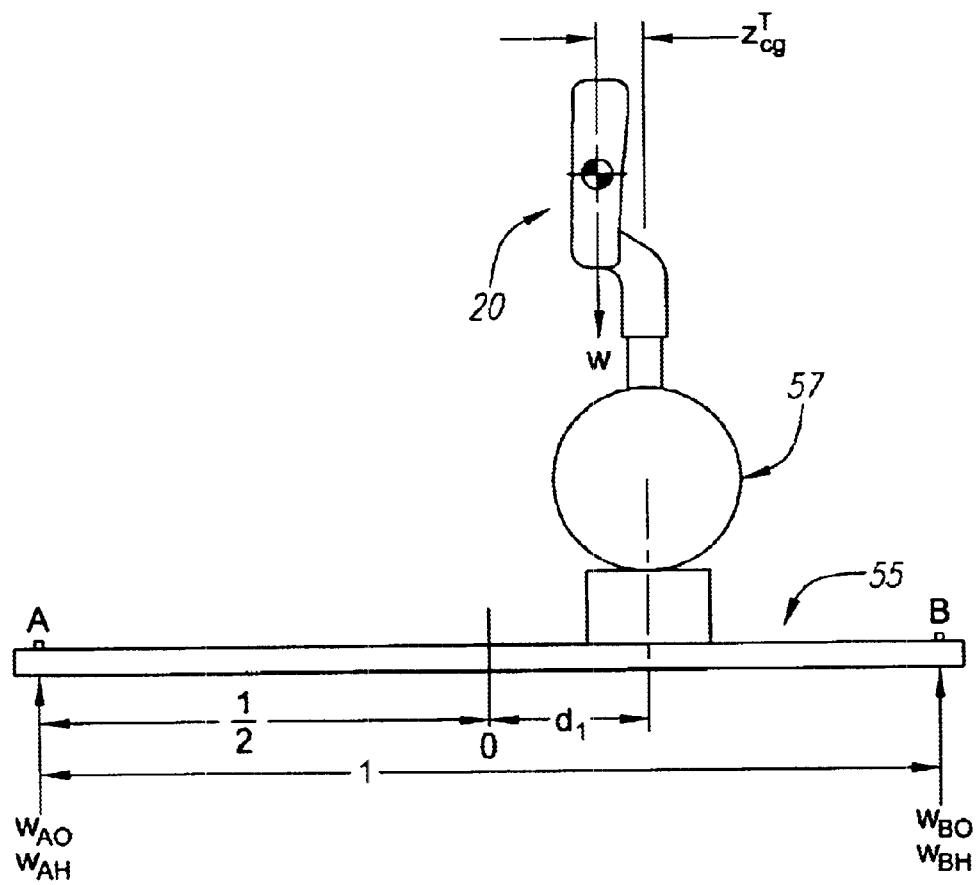
FIG. 12B is an illustration of a center of gravity table for a golf club head of the present invention used to measure the center of gravity along the Z axis.

The center of gravity and the moment of inertia of a golf club head 20 are preferably measured using a test frame ($X^T$, $Y^T$, $Z^T$), and then transformed to a head frame ($X^H$, $Y^H$, $Z^H$), as shown in FIGS. 11 and 11A. The center of gravity of a golf club head may be obtained using a center of gravity table 55 having two weight scales thereon, as shown in FIGS. 12, 12A and 12B. If a shaft is present, it is removed and replaced with a hosel cube 57 that has a multitude of faces normal to the axes of the golf club head 20. Given the weight of the golf club head 20, the scales allow one to determine the weight distribution of the golf club head when the golf club head is placed on both scales simultaneously and weighed along a particular direction, the X, Y or Z direction. The weight scales are parallel to the earth's gravity allowing the weight distribution along each direction to be calculated to determine the location of the center of gravity where:

$W_{AO}$, $W_{BO}$: Weight without head (fixture)

and $W_{AH}$, $W_{BH}$: Weight with head

The X axis location is determined using the following equations:

$$\sum M_A = 0 = (W_{BH} - W_{BO})l - rW$$

$$r = \frac{(W_{BH} - W_{BO})}{W}l$$

constraint $$\frac{l}{2} + d_1 = r + X_{cg}^T + s + \frac{d}{2}$$

$$\boxed{-X_{cg}^T = \frac{(W_{BH} - W_{BO})}{W}l + S + \frac{d}{2} - \frac{l}{2} - d_1}$$

The Y axis location is determined using the following equations:

$$\sum M_A = 0 = (W_{BH} - W_{BO})l - rW$$

$$r = \frac{(W_{BH} - W_{BO})}{W}l$$

Constraint $$\frac{l}{2} + d_1 = r + Y_{cg}^T$$

$$\boxed{Y_{cg}^T = -\frac{(W_{BH} - W_{BO})}{W}l + l + \frac{d_1}{2}}$$

The Z axis location is determined using the following equations:

$$\sum M_A = \overline{o} = (W_{BH} - W_{BO})$$

$$r = \frac{(W_{BH} - W_{BO})}{W}l$$

Constraint $$\frac{l}{2} + d_1 = r + Z_{cg}^T$$

$$\boxed{-Z_{cg}^T = \frac{(W_{BH} - W_{BO})}{W}l - \frac{l}{2} - d_1}$$

Once the test frame coordinates are determined, they are transformed to head frame coordinates using the following equations:

$$X_{cg}^H = -Z_{cg}^T$$

$$Y_{cg}^H = -X_{cg} \cos(\alpha_{lie}) + Y_{cg} \sin(\alpha_{lie}) - d_z/\tan(\alpha_{lie})$$

$$Z_{cg}^H = -X_{cg} \sin(\alpha_{lie}) + Y_{cg} \cos(\alpha_{lie}) + d_z$$

$$\begin{Bmatrix} X_{cg}^H \\ Y_{cg}^H \\ Z_{cg}^H \end{Bmatrix} = \begin{pmatrix} 0 & 0 & -1 \\ -\cos(\alpha_{lie}) & \sin(\alpha_{lie}) & 0 \\ \sin(\alpha_{lie}) & \cos(\alpha_{lie}) & 0 \end{pmatrix} \begin{Bmatrix} X_{cg}^T \\ Y_{cg}^T \\ Z_{cg}^T \end{Bmatrix} + \Delta z \begin{Bmatrix} 0 \\ -1/\tan(\alpha_{lie}) \\ 1 \end{Bmatrix}$$

The moment of inertia is measured using an Inertia Dynamic Moment of Inertia machine 59 as shown in FIGS. 12C, 12D and 12E. The machine 59 has a rectangular plate with adapter holes spaced 0.5 inch apart from each other. The rectangular plate is mounted on the machine 59 to allow oscillation thereof. A golf club head 20 is placed on the rectangular plate and the time for one oscillation period is measured by the machine. The oscillation time is directly related to the moment of inertia of the golf club head about the axis of rotation of the machine, which in effect is a single degree of freedom with the restoring force generated by a torsional spring.

By changing the orientation of how the golf club head is mounted on the plate, the desired moment of inertia may be measured for an axis. Nine different orientations are required to generate an inertia tensor, and since the moment of inertia measured includes the plate and the adapter, nine additional measurements are required to measure the baseline moment of inertia of the initial setup. The moment of inertia of the golf club head is the difference between the measurement taken with the golf club head, adapter and plate and the internal rotating mass of the machine, and that of the just the adapter and plate and the internal rotating mass of the machine. For the nine measurements done with the golf club head, the orientations are the same from head to head, the position on the rectangular plate depends on the center of gravity of the particular golf club head. The nine measurements without the golf club head are the same for orientation and the location of the adapter. The machine has a center of gravity and moment of inertia program to calculate the adapter holes on the rectangular plate that place the center of gravity closest to the axis of rotation, thereby minimizing error. The program uses the parallel axis theorem to account for the axis of rotation not containing the center of gravity of the golf club head. This will yield an inertia tensor about the center of gravity, which in turn allows the moment of inertia about any axis to be calculated for the golf club head.

TABLE One

| CLUB | MASS (gm) | CG (In) | | | Inertra (gm · cm²) | | | | | |
|---|---|---|---|---|---|---|---|---|---|---|
| | | X | Y | Z | Ixx | Iyy | Izz | Ixy | Ixz | Iyz |
| Crane Japan 1 Composite Driver | 193.9 | 0.433 | 0.944 | 0.933 | 1,700.13 | 1,044.17 | 2,150.47 | 162.12 | 3.21 | −47.49 |
| Diawa 1, G-3 Composite Driver | 186.5 | 0.707 | 0.746 | 0.87 | 1,248.07 | 1,298.21 | 1,951.54 | 89.81 | −94.18 | −1.18 |
| Pro Spirit 11° Composite Driver | 198.7 | 0.433 | 0.944 | 0.933 | 1,480.37 | 1,073.10 | 1,985.16 | 143.86 | −81.3 | 55.2 |
| Zett 10° Composite Driver | 208.8 | 0.322 | 0.547 | 1.227 | 1,989.14 | 1,166.16 | 2,155.67 | 197.83 | −62.25 | −151.52 |
| EDO 10° Composite Driver | 204.4 | 0.656 | 1.208 | 0.825 | 2,011.04 | 1,139.42 | 2,166.16 | 280.19 | −90.01 | −282.14 |
| Yonex 1 ADX 100i Composite Driver | 200 | 0.602 | 1.037 | 0.844 | 1,631.59 | 1,161.33 | 2,052.75 | 104.05 | −41.22 | 33.45 |
| Yonex 1 Aerona 300 Composite Driver | 202.9 | 0.494 | 0.624 | 0.919 | 1,876.79 | 1,155.33 | 2,435.72 | 205.06 | −92.64 | 21.86 |

Table One lists the location of the center of gravity, the moments of inertia about the center of gravity, and the products of inertia for prior art composite golf club heads. The moment of inertia Izz about the Z axis is less than 2436.00 g-cm$^2$ for any of the prior art composite heads. The highest moment of inertia, Izz, about the Z axis is 2435.72 g-cm$^2$ for the Yonex 1 AERONA 300 composite driver. The moment of inertia, Iyy, about the Y axis is less than 1300.00 g-cm$^2$ for any of the prior art composite heads. The highest moment of inertia, Iyy, about the Y axis is 1298.21 g-cm$^2$ for the Daiwa 1, G 3 composite driver. The mass for all of the composite heads of Table One ranges from 186 grams to 208.5 grams. Each of the composite golf clubs of Table One that has a high moment of inertia or a volume greater than 300 cc, has an absolute value for the product of inertia Ixy that is over 100 g-cm$^2$ and/or a negative product of inertia Iyz. For example, the Yonex 1 AERONA 300 has the highest moment of inertia of Table One, but its product of inertia Ixy is 205.06 g-cm$^2$. The absolute values of the products of inertia Ixy and Ixz of Daiwa 1, G-3 are below 100 g-cm$^2$, but the G-3 has a golf club head volume of only 195 cc, a negative product of inertia Iyz, and its highest moment of inertia is only 1951.54 g-cm$^2$. Thus, the Daiwa 1, G-3 fails to demonstrate a golf club with a high volume or high moment of inertia, absolute values for products of inertia Ixy and Ixz below 100 g-cm$^2$, and a positive product of inertia Iyz.

TABLE Two

| Club Head | Mass | Ixx | Iyy | Izz | Ixy | Ixz | Iyz | Volume |
|---|---|---|---|---|---|---|---|---|
| GBB ® 9 Deg | 189 | 1802 | 1752 | 2750 | 212 | 8 | 99 | 250 |
| BBB 9 Deg | 189 | 2135 | 1763 | 2900 | 208 | 31 | 149 | 295 |
| Hawk Eye ® 10 Deg | 194 | 1886 | 1562 | 2607 | 134 | −77 | 120 | 275 |
| Steelhead ™ Plus 10 Deg | 197 | 1722 | 1389 | 2300 | 238 | −23 | 143 | 225 |
| ERC ® | 188 | 2119 | 1654 | 2697 | 155 | −43 | 120 | 300 |

Table Two lists the moments of inertia about the center of gravity, and the products of inertia for prior art metal golf club heads from Callaway Golf Company of Carlsbad, Calif., beginning with the GREAT BIG BERTHA® cast titanium driver in row 1, the BIGGEST BIG BERTHA® cast titanium driver in row 2, the GREAT BIG BERTHA® HAWK EYE® cast titanium driver in row 3, the BIG BERTHA® STEELHEAD PLUS™ cast stainless steel driver in row 4, and the ERC® forged titanium driver in row 5. The moment of inertia Izz about the Z axis is less than 2900.00 g-cm$^2$ for any of the golf club heads of Table Two. The highest moment of inertia, Izz, about the Z axis, is 2900 g-cm$^2$ for the CALLAWAY GOLF® BIGGEST BIG BERTHA® driver. The moment of inertia, Iyy, about the Y axis is less than 1800.00 g-cm$^2$ for any of the club heads of Table Two. The mass for all of the club heads of Table Two ranges from 186 grams to 208.5 grams. All of the club heads of Table Two have an absolute value for the product of inertia Ixy that is over 100 g-cm$^2$. For example, the product of inertia Ixy for the GREAT BIG BERTHA® driver is over an absolute value of 100 g-cm$^2$.

TABLE Three

| Head | Weighting | Ixx | Iyy | Izz | Ixy | Ixz | Iyz |
|---|---|---|---|---|---|---|---|
| Ex. 1 | 195 g | 2700 | 2000 | 3500 | 75 | 75 | 75. |

Table Three lists the moments of inertia and products of inertia for a golf club head 20 of the present invention. An "unweighted" club head 20 (without the weight members 40) weighs from 90 grams to 120 grams thereby allowing for 60 grams to 105 grams of weight to be placed accordingly to achieve the reduced products of inertia for the golf club head 20 of the present invention. The moment of inertia, Izz, about the Z axis for the golf club head 20 of the present invention will range from 2800 g-cm$^2$ to 5000 g-cm$^2$, preferably from 3000 g-cm$^2$ to 4500 g-cm$^2$, and most preferably from 3500 g-cm$^2$ to 4000 g-cm$^2$. The moment of inertia, Iyy, about the Y axis for the golf club head 20 of the present invention will range from 1500 g-cm$^2$ to 2500 g-cm$^2$, preferably from 1800 g-cm$^2$ to 2100 g-cm$^2$, and most preferably from 1900 g-cm$^2$ to 2050 g-cm$^2$. The product of inertia Ixy of the golf club head 20 of the present invention 20 has an absolute value less than 100 g-cm$^2$. Preferably, the product of inertia Ixy is less than 50 g-cm$^2$, and most preferably the product of inertia Ixy approaches zero. The product of inertia Ixz of the golf club head 20 of the present invention 20 has an absolute value less than 100 g-cm$^2$. Preferably, the product of inertia Ixz is less than 50 g-cm$^2$, and most preferably the product of inertia Ixz approaches zero. The product of inertia Iyz of the golf club head 20 of the present invention 20 has a value greater than 0 g-cm$^2$. Preferably, the product of inertia Iyz is between 0 g-cm$^2$ and 300 g-cm$^2$, and most preferably the product of inertia Iyz is between 50 g-cm$^2$ and 200 g-cm$^2$.

FIGS. 13–38 illustrate how the products of inertia affect the distance and dispersion of a golf ball struck with a golf club.

Figure 13:
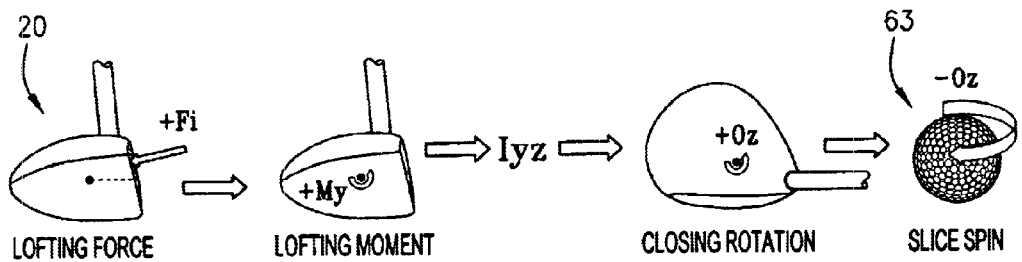
FIG. 13 is an illustration of the effect of the product of inertia Iyz on a lofting force from a high-center strike of a golf ball against the striking plate a golf club.

FIG. 13 illustrates the effects of the product of inertia, Iyz, for a lofting force from a high center hit. High center hits are defined as hits that have their impulse vector above the center of gravity of the golf club head 20, and low center hits are defined as hits that have their impulse vector below the center of gravity of the golf club head 20. For a high center hits, as shown in FIG. 13, the product of inertia Iyz causes a lofting moment in the golf club head 20 which creates a closing rotation thereby leading to a slice spin in the golf ball 63.

Figure 14:
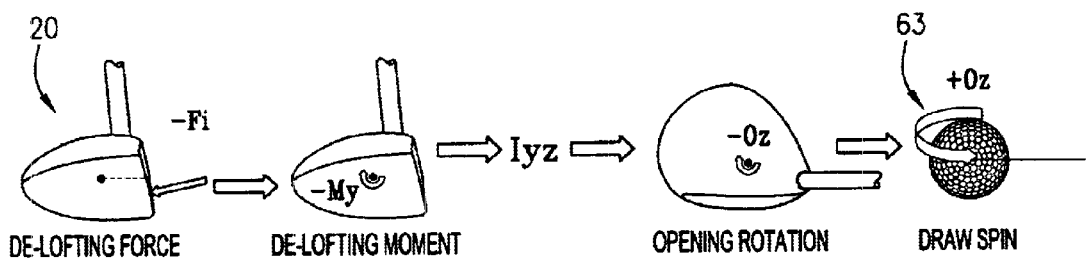
FIG. 14 is an illustration of the effect of the product of inertia Iyz on a de-lofting force from a low-center strike of a golf ball against the striking plate a golf club.

FIG. 14 illustrates the effects of the product of inertia, Iyz, for a de-lofting force from a low center hit. The product of inertia Iyz causes a de-lofting moment in the golf club head 20 which creates an opening rotation thereby leading to a draw spin in the golf ball 63.

Figure 15:
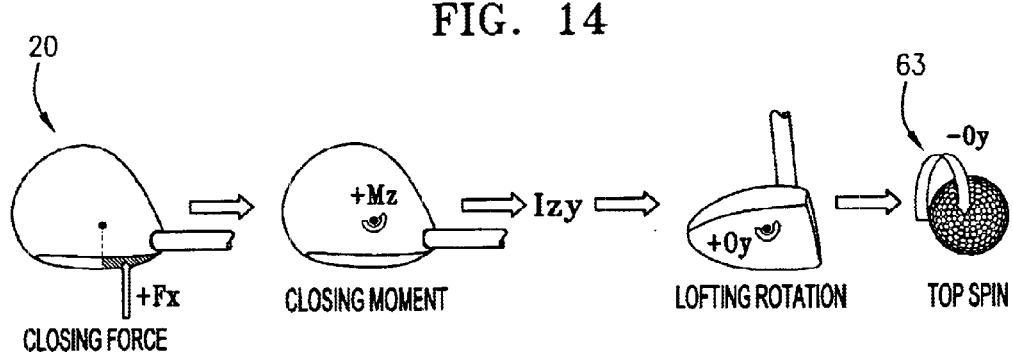
FIG. 15 is an illustration of the effect of the product of inertia Izy on a closing force from a off-center heel strike of a golf ball against the striking plate a golf club.

FIG. 15 illustrates the effects of the product of inertia, Iyz, for a closing force from an off center heel hit. The product of inertia Iyz causes a closing moment in the golf club head 20 which creates a lofting rotation thereby leading to a top spin in the golf ball 63.

Figure 16:
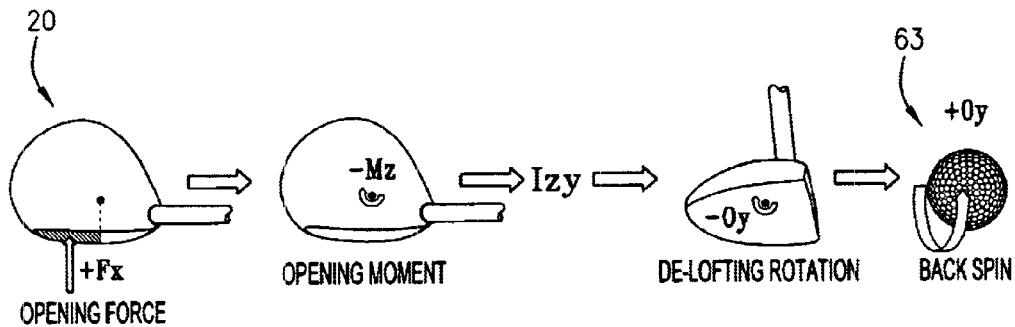
FIG. 16 is an illustration of the effect of the product of inertia Izy on an opening force from a off-center toe strike of a golf ball against the striking plate a golf club.

FIG. 16 illustrates the effects of the product of inertia, Iyz, for a opening force from an off center toe hit. The product of inertia Iyz causes an opening moment in the golf club head 20 which creates a de-lofting rotation thereby leading to a back spin in the golf ball 63.

Figure 17:
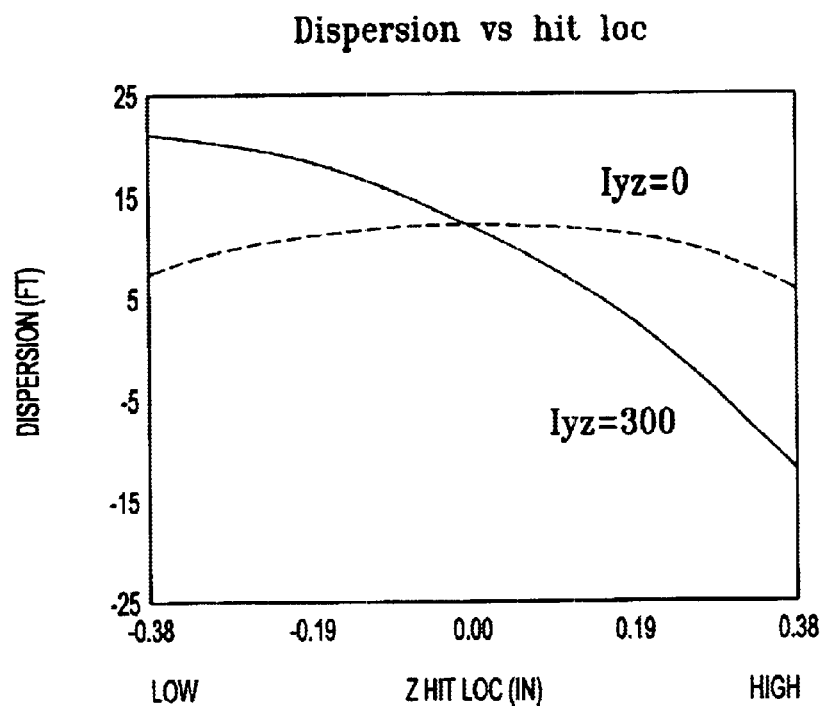
FIG. 17 is a graph of dispersion (y-axis) vs. hit location (x-axis) for a golf club having a product of inertia Iyz=0, and a golf club having a product of inertia Iyz=300.

FIG. 17 illustrates the effects of the product of inertia Iyz on the dispersion of a golf ball. A golf club having a product of inertia Iyz of zero has a relatively small dispersion for any hit location whereas golf club having a product of inertia Iyz of 300 (absolute value) has a dispersion that varies 35 feet depending on the hit location.

Figure 18:
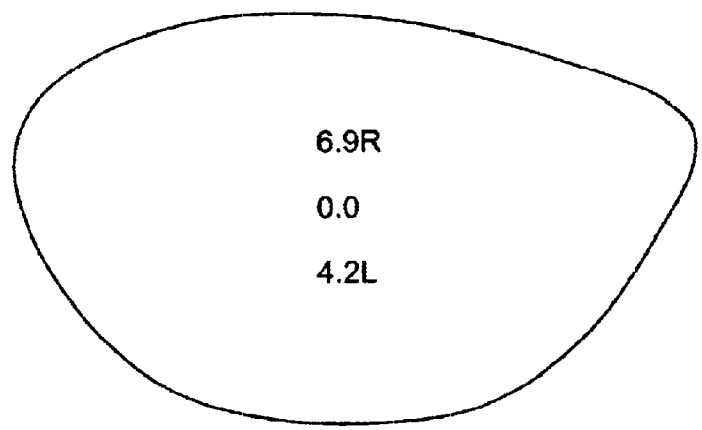
FIG. 18 is a schematic drawing of a face of a golf club head with the change in dispersion at three different hit locations per 100 g-cm² increase in the product of inertia Iyz.

FIG. 18 illustrates the effect on dispersion from increasing the product of inertia Iyz. A high center hit will have a 6.9 feet dispersion to the right (R) per 100 g-cm$^2$ increase in Iyz, and a low center hit will have a 4.2 feet dispersion to the left (L) per 100 g-cm$^2$ increase in Iyz.

Figure 19:
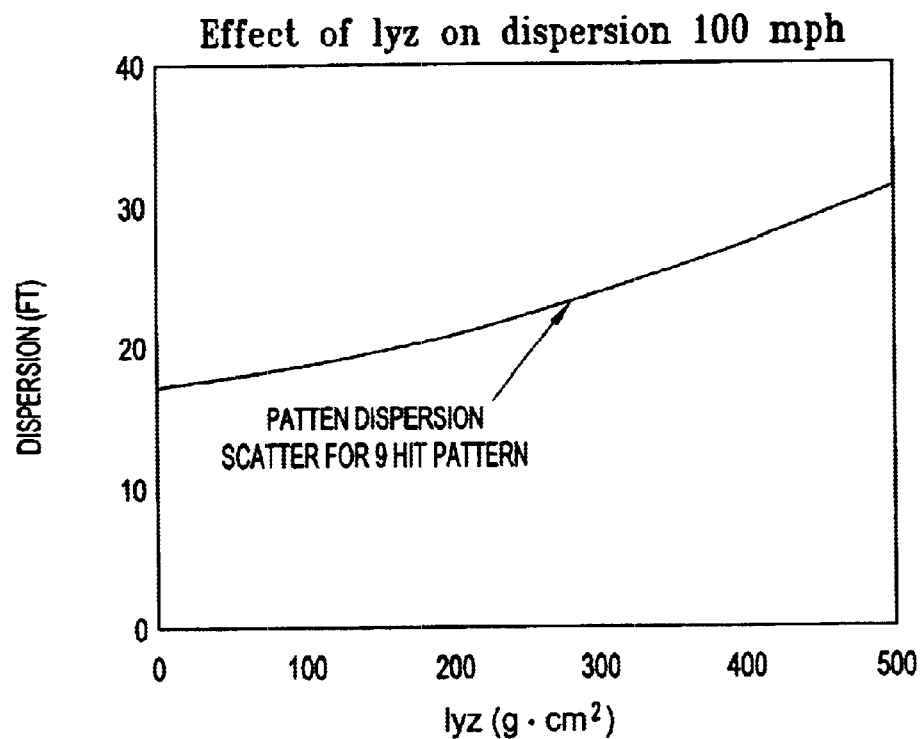
FIG. 19 is a graph of dispersion (y-axis) vs. the product of inertia Iyz (x-axis) for a pattern dispersion scatter.

FIG. 19 illustrates the effect on dispersion from increasing the product of inertia Iyz for the average of a nine hit pattern.

Figure 20:
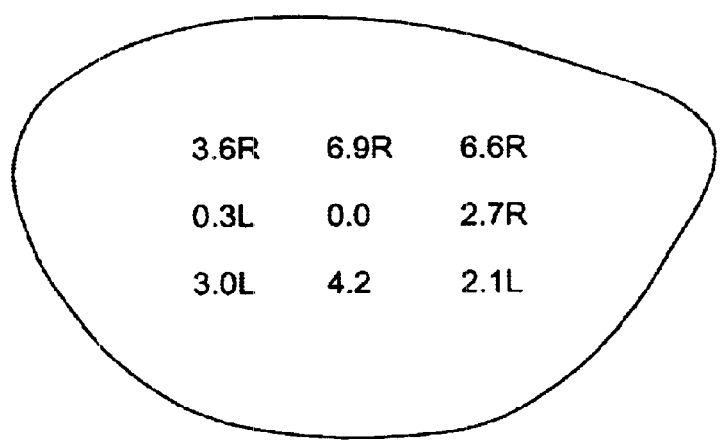
FIG. 20 is a schematic drawing of a face of a golf club head with the change in dispersion at nine different hit locations per 100 g-cm² increase in the product of inertia Iyz.

FIG. 20 illustrates the nine-hit location effect on dispersion from increasing the product of inertia Iyz.

Figure 21:
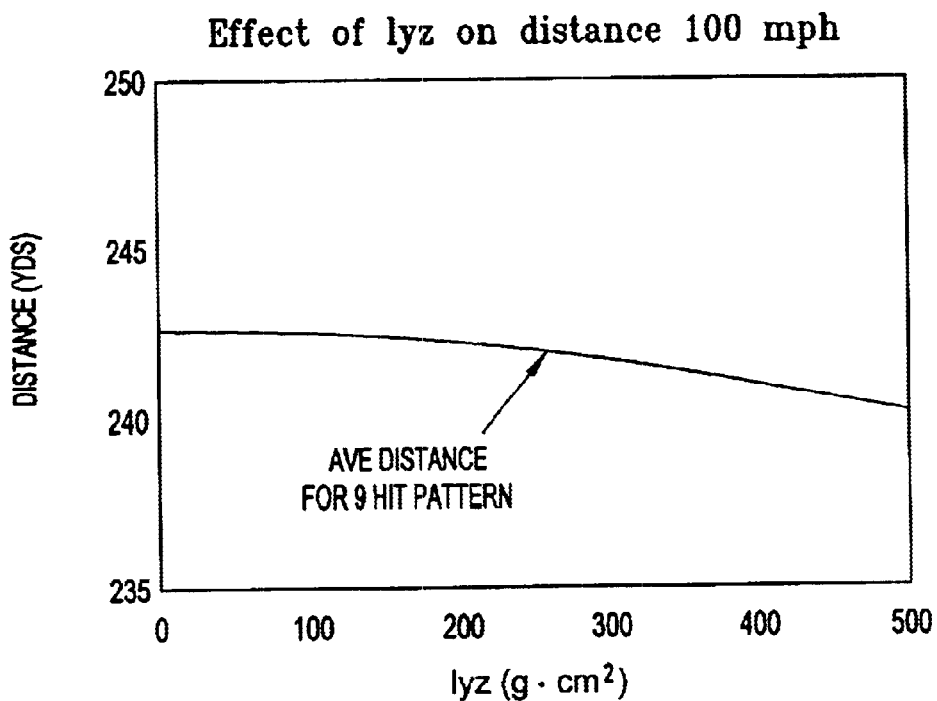
FIG. 21 is a graph of distance (y-axis) vs. the product of inertia Iyz (x-axis).
Figure 22:
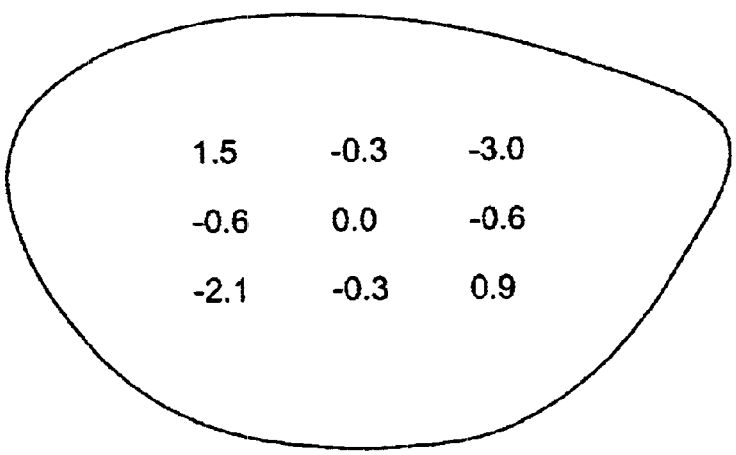
FIG. 22 is a schematic drawing of a face of a golf club head with the change in distance at nine different hit locations per 100 g-cm² increase in the product of inertia Iyz.

FIGS. 21 and 22 illustrate the effect on distance from increasing the product of inertia Iyz for the average of a nine hit pattern. For example, a high center hit will have a −0.3 yard effect on distance per 100 g-cm² increase in Iyz, and a high toe hit will have a 1.5 yard effect on distance per 100 g-cm² increase in Iyz.

Figure 23:
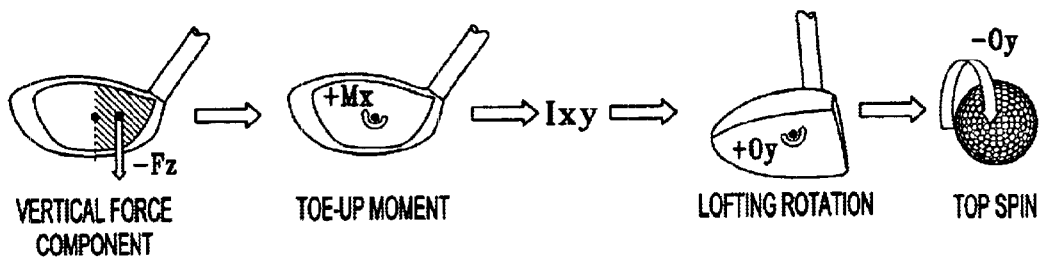
FIG. 23 is an illustration of the effect of the product of inertia Ixy on a vertical force from a off-center heel strike of a golf ball against the striking plate a golf club.

FIG. 23 illustrates the effects of the product of inertia Ixy for a vertical force from an off-center heel hit. The product of inertia Ixy causes a toe-up moment in the golf club head 20 which creates a lofting rotation thereby leading to a top spin in the golf ball 63.

Figure 24:
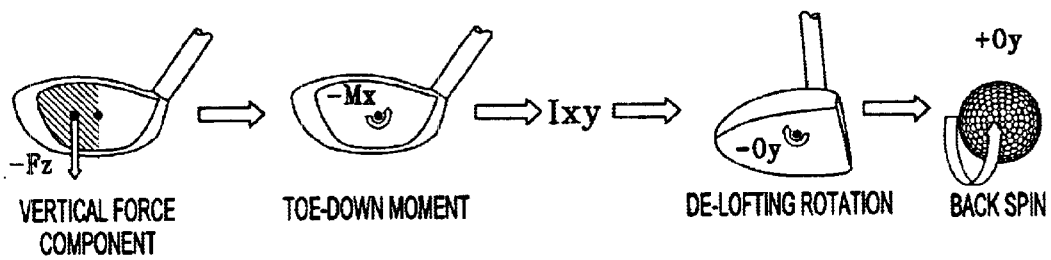
FIG. 24 is an illustration of the effect of the product of inertia Ixy on a vertical force from a off-center toe strike of a golf ball against the striking plate a golf club.

FIG. 24 illustrates the effects of the product of inertia Ixy for a vertical force from an off-center toe hit. The product of inertia Ixy causes a toe-down moment in the golf club head 20 which creates a de-lofting rotation thereby leading to a back spin in the golf ball 63.

Figure 25:
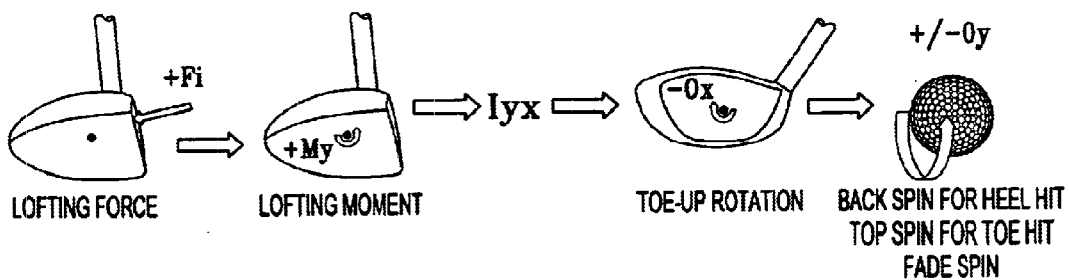
FIG. 25 is an illustration of the effect of the product of inertia Ixy on a lofting force from a high-center strike of a golf ball against the striking plate a golf club.

FIG. 25 illustrates the effects of the product of inertia Ixy for a lofting force from a high center hit. The product of inertia Ixy causes a lofting moment in the golf club head 20 which creates a toe-up rotation thereby leading to the golf ball 63 having a back spin for a heel hit, a top spin for a toe hit and a fade spin for a center hit.

Figure 26:
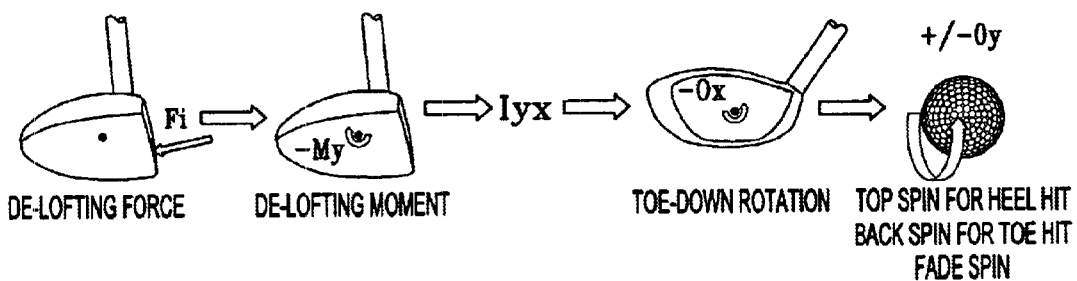
FIG. 26 is an illustration of the effect of the product of inertia Ixy on a de-lofting force from a low-center strike of a golf ball against the striking plate a golf club.

FIG. 26 illustrates the effects of the product of inertia Ixy for a de-lofting force from a low center hit. The product of inertia Ixy causes a de-lofting moment in the golf club head 20 which creates a toe-down rotation thereby leading to the golf ball 63 having a back spin for a toe hit, a top spin for a heel hit and a fade spin for a center hit.

Figure 27:
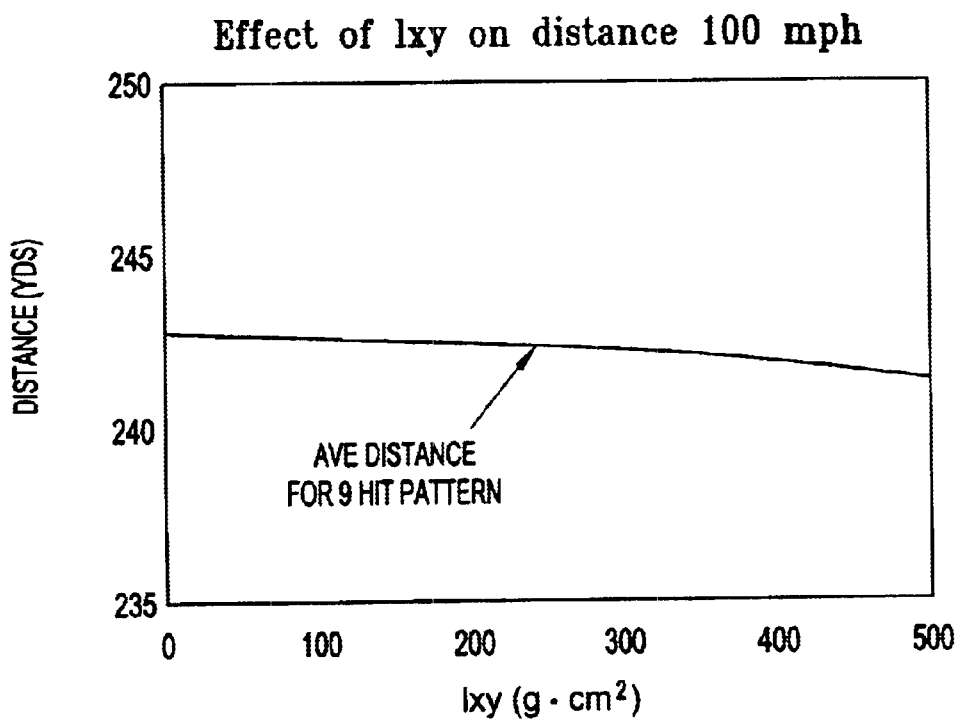
FIG. 27 is a graph of distance (y-axis) vs. the product of inertia Ixy (x-axis).
Figure 28:
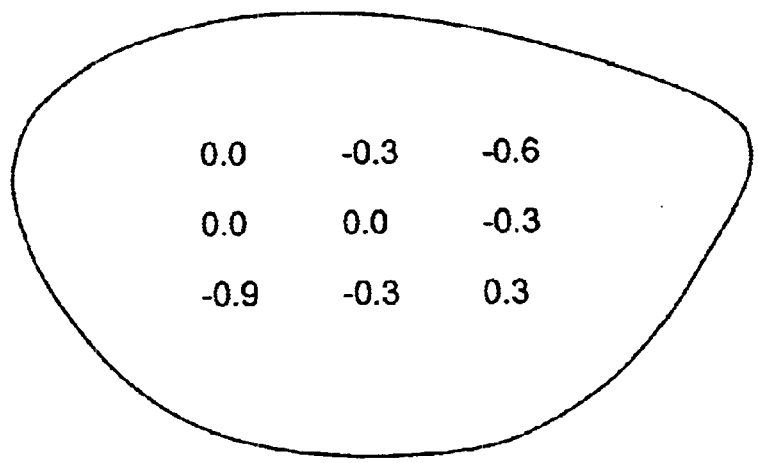
FIG. 28 is a schematic drawing of a face of a golf club head with the change in distance at nine different hit locations per 100 g-cm² increase in the product of inertia Ixy.

FIGS. 27 and 28 illustrate the effect on distance from increasing the product of inertia Ixy for the average of a nine hit pattern. For example, a high center hit will have a −0.3 yard effect on distance per 100 g-cm² increase in Ixy, and a low toe hit will have a −0.9 yard effect on distance per 100 g-cm² increase in Ixy.

Figure 29:
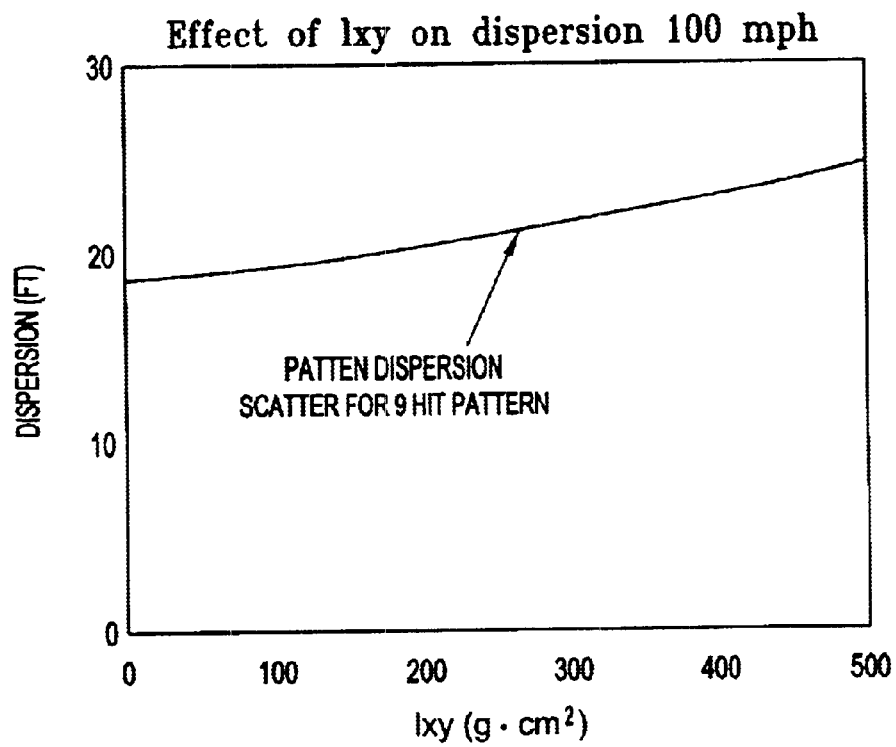
FIG. 29 is a graph of dispersion (y-axis) vs. the product of inertia Ixy (x-axis) for a pattern dispersion scatter.
Figure 30:
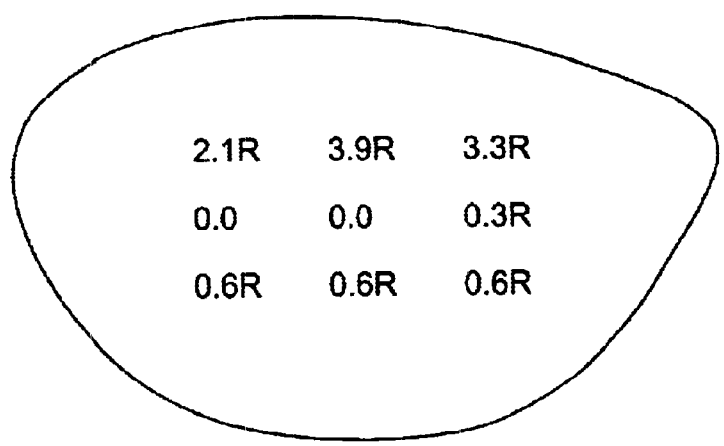
FIG. 30 is a schematic drawing of a face of a golf club head with the change in dispersion at nine different hit locations per 100 g-cm² increase in the product of inertia Ixy.

FIGS. 29 and 30 illustrate the effect on dispersion from increasing the product of inertia Ixy for the average of a nine hit pattern. For example, a high center hit will have a 3.9 feet effect to the right per 100 g-cm² increase in Ixy, and a high toe hit will have a 2.1 feet effect to the right per 100 g-cm² increase in Ixy.

Figure 31:
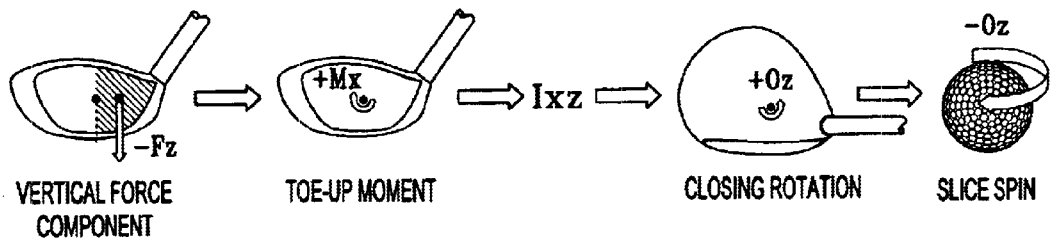
FIG. 31 is an illustration of the effect of the product of inertia Ixz on a vertical force from a off-center heel strike of a golf ball against the striking plate a golf club.

FIG. 31 illustrates the effects of the product of inertia Izx for a vertical force from an off-center heel hit. The product of inertia Izx causes a toe-up moment in the golf club head 20 which creates a closing rotation thereby leading to a slice spin in the golf ball 63.

Figure 32:
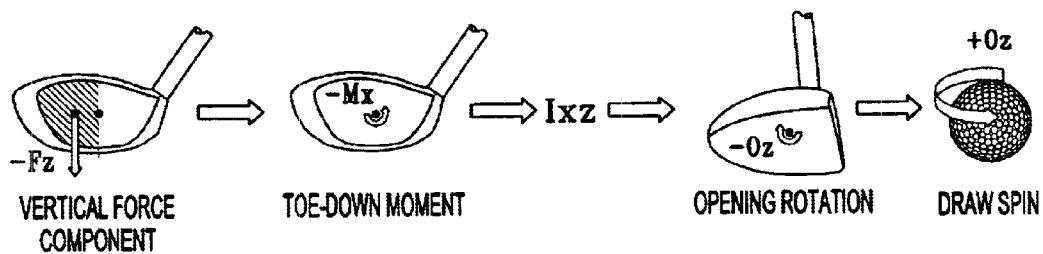
FIG. 32 is an illustration of the effect of the product of inertia Ixz on a vertical force from a off-center toe strike of a golf ball against the striking plate a golf club.

FIG. 32 illustrates the effects of the product of inertia Izx for a vertical force from an off-center toe hit. The product of inertia Izx causes a toe-down moment in the golf club head 20 which creates an opening rotation thereby leading to a draw spin in the golf ball 63.

Figure 33:
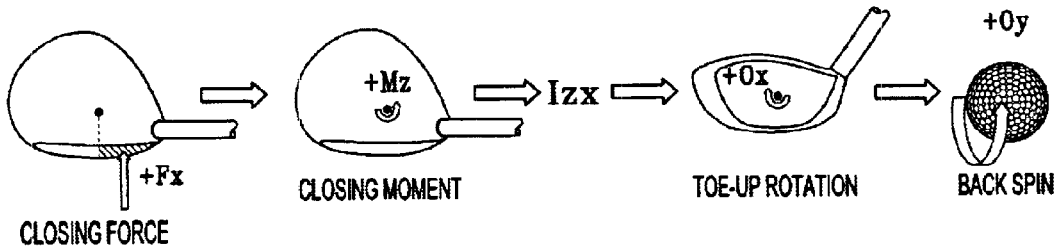
FIG. 33 is an illustration of the effect of the product of inertia Ixz on a closing force from a off-center heel strike of a golf ball against the striking plate a golf club.

FIG. 33 illustrates the effects of the product of inertia, Izx, for a closing force from an off center heel hit. The product of inertia Izx causes a closing moment in the golf club head 20 which creates a toe-up rotation thereby leading to a back spin in the golf ball 63.

Figure 34:
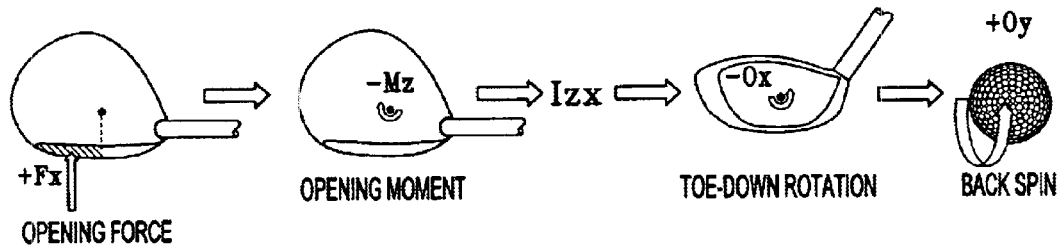
FIG. 34 is an illustration of the effect of the product of inertia Ixz on an opening force from a off-center toe strike of a golf ball against the striking plate a golf club.

FIG. 34 illustrates the effects of the product of inertia, Izx, for a opening force from an off center toe hit. The product of inertia Izx causes an opening moment in the golf club head 20 which creates a toe-down rotation thereby leading to a back spin in the golf ball 63.

Figure 35:
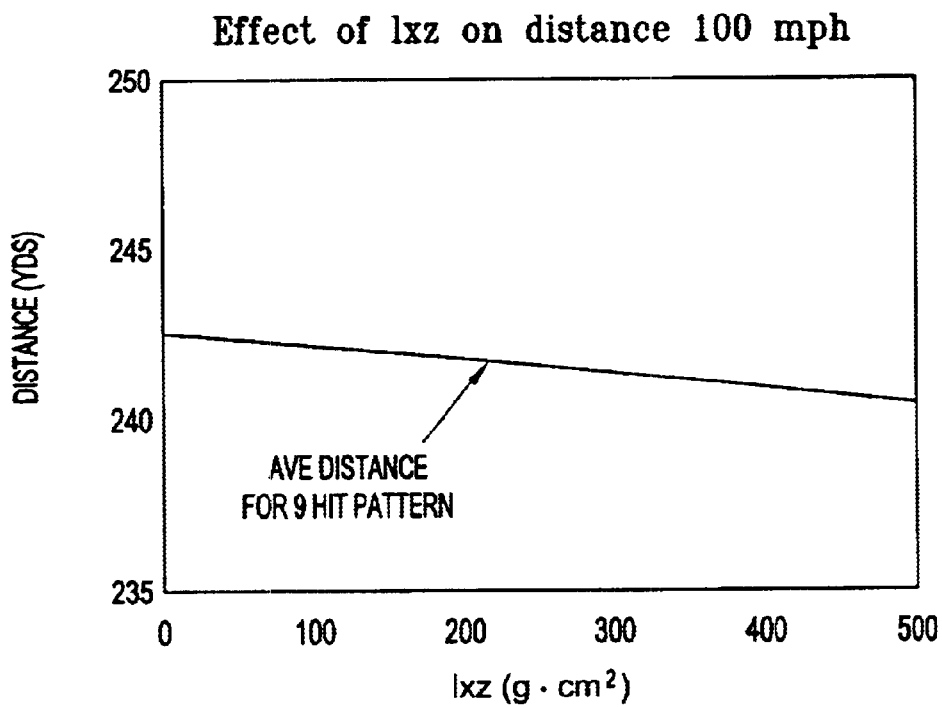
FIG. 35 is a graph of distance (y-axis) vs. the product of inertia Ixz (x-axis).
Figure 36:
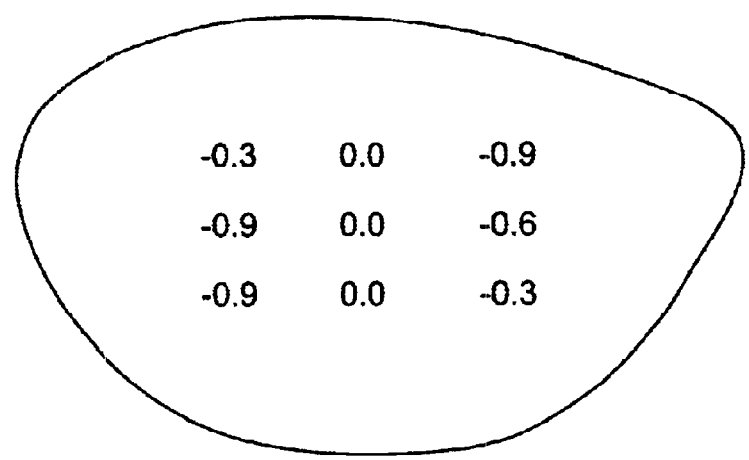
FIG. 36 is a schematic drawing of a face of a golf club head with the change in distance at nine different hit locations per 100 g-cm$^2$ increase in the product of inertia Ixz.

FIGS. 35 and 36 illustrate the effect on distance from increasing the product of inertia Ixz for the average of a nine hit pattern. For example, a high heel hit will have a −0.9 yard effect on distance per 100 g-cm² increase in Ixz, and a low toe hit will have a −0.9 yard effect on distance per 100 g-cm² increase in Ixz.

Figure 37:
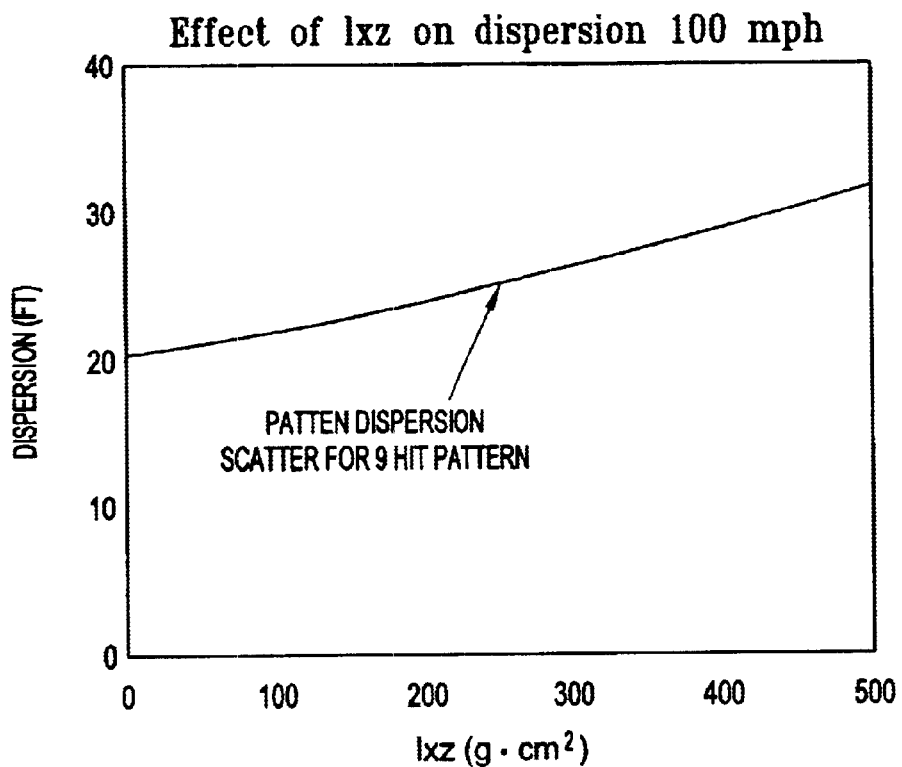
FIG. 37 is a graph of dispersion (y-axis) vs. the product of inertia Ixz (x-axis) for a pattern dispersion scatter.
Figure 38:
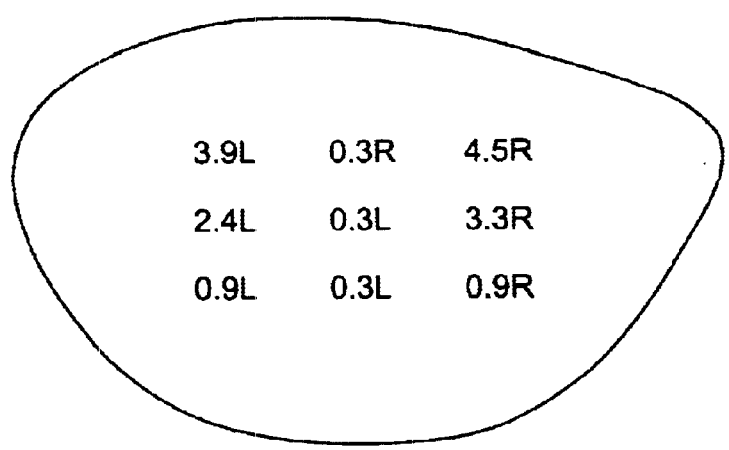
FIG. 38 is a schematic drawing of a face of a golf club head with the change in dispersion at nine different hit locations per 100 g-cm$^2$ increase in the product of inertia Ixz.

FIGS. 37 and 38 illustrate the effect on dispersion from increasing the product of inertia Ixz for the average of a nine hit pattern. For example, a high heel hit will have a 4.5 feet effect to the right per 100 g-cm² increase in Ixz, and a high toe hit will have a 3.9 feet effect to the left per 100 g-cm² increase in Ixz.

Figure 39:
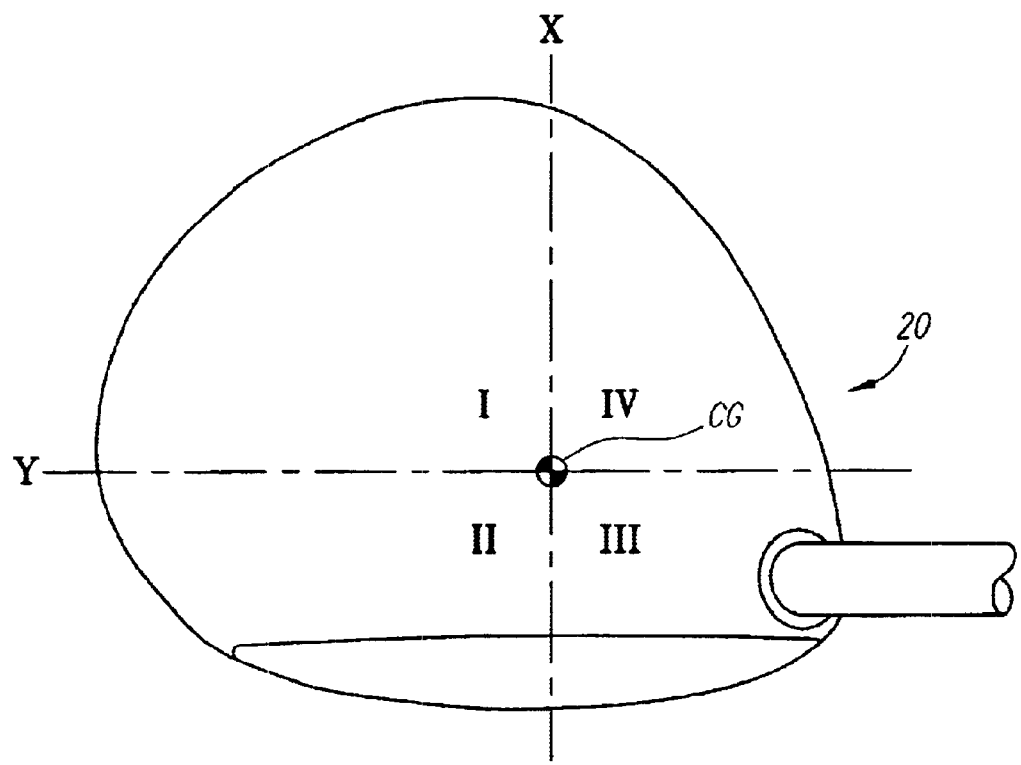
FIG. 39 is a top view of the golf club of the present invention partitioned into four quadrants by the X axis and the Y axis through the center of gravity.

As shown in FIG. 39, the club head 20 of the present invention is partitioned into four regions, I, II, III and IV. Mass added in either regions I or III increases the product of inertia Ixy whereas mass add in either regions II or IV decreases the product of inertia Ixy. The location at which mass is added within any given region determines the magnitude of change to Ixy. An incremental change in Ixy is determined by the amount of mass "m" added and the X and Y coordinate location of the mass (wherein X and Y are measured from the center of gravity, CG, of the golf club head 20) using the following formula:

$$Ixy = \iint m\, dx\, dy$$

As a result, adding mass along the X or Y axis has no effect on Ixy while adding mass along a diagonal line bisecting the X and Y axes results in maximal effect (additive or subtractive) on Ixy.

Figure 40:
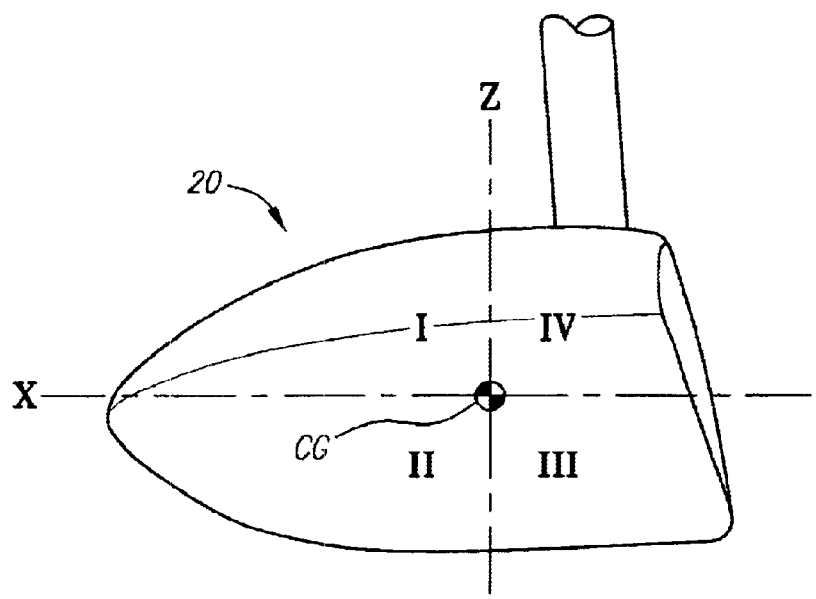
FIG. 40 is a toe-side view of the golf club of the present invention partitioned into four quadrants by the X axis and the Z axis through the center of gravity.

As shown in FIG. 40, the club head 20 of the present invention is partitioned into four regions, I, II, III and IV. Mass added in either regions I or III increases the product of inertia Ixz whereas mass add in either regions II or IV decreases the product of inertia Ixz. The location at which mass is added within any given region determines the magnitude of change to Ixz. An incremental change in Ixz is determined by the amount of mass "m" added and the X and Z coordinate location of the mass (wherein X and Z are measured from the center of gravity, CG, of the golf club head 20) using the following formula:

$$Ixz = \iint m\, dx\, dz$$

As a result, adding mass along the X or Z axis has no effect on Ixz while adding mass along a diagonal line bisecting the X and Z axes results in maximal effect (additive or subtractive) on Ixz.

Figure 41:
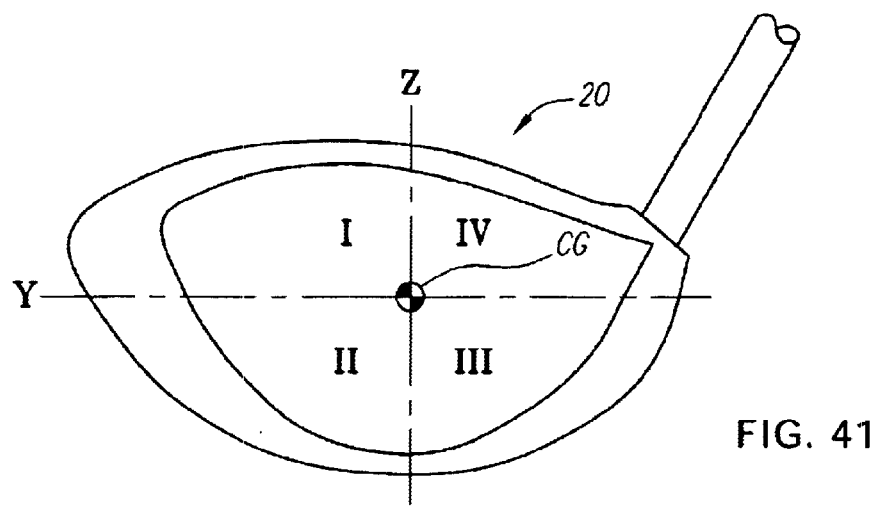
FIG. 41 is a front view of the golf club of the present invention partitioned into four quadrants by the Y axis and the Z axis through the center of gravity.

As shown in FIG. 41, the club head 20 of the present invention is partitioned into four regions, I, II, III and IV. Mass added in either regions I or III increase the product of inertia Iyz whereas mass add in either regions II or IV decreases the product of inertia Iyz. The location at which mass is added within any given region determines the magnitude of change to Iyz. An incremental change in Iyz is determined by the amount of mass "m" added and the Y and Z coordinate location of the mass (wherein Y and Z are measured from the center of gravity, CG, of the golf club head 20) using the following formula:

$$Iyz = \iint m\, dy\, dz$$

As a result, adding mass along the Y or Z axis has no effect on Iyz while adding mass along a diagonal line bisecting the Y and Z axes results in maximal effect (additive or subtractive) on Iyz.

Figure 42:
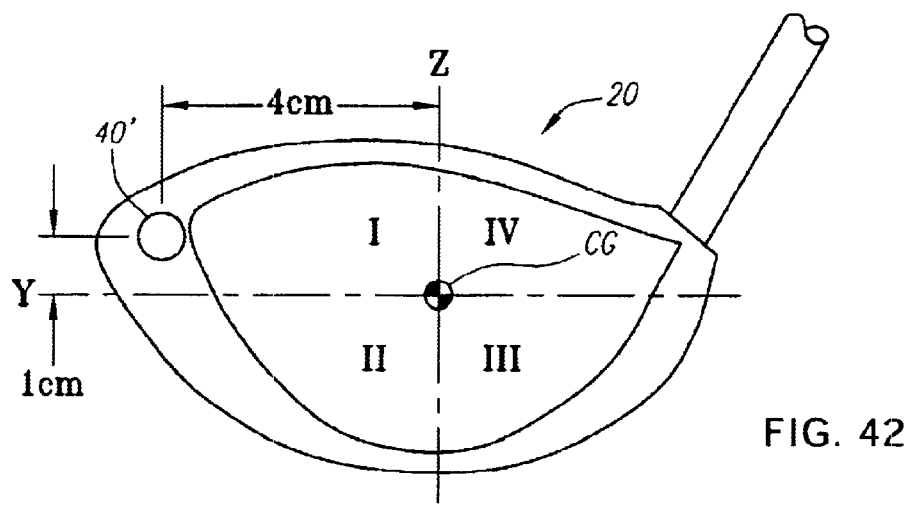
FIG. 42 is a front view of the golf club of the present invention partitioned into four quadrants by the Y axis and the Z axis through the center of gravity, with a weight member positioned in quadrant I.

To illustrate the effect on Iyz, a five gram weight member 40' is added to the club head 20 as shown in FIG. 42. The weight is added at a location in quadrant I at four centimeters along the Y axis from the center of gravity and one centimeter along Z axis from the center of gravity. Using the above formula, $Iyz = \iint m\, dy\, dz$, then Iyz=5 g*4 cm*1 cm=20 g-cm². The precise effect of the weight member 40' on Iyz is determined by accounting for the finite size of the mass by integrating over the area of the weight member 40'.

Figure 43:
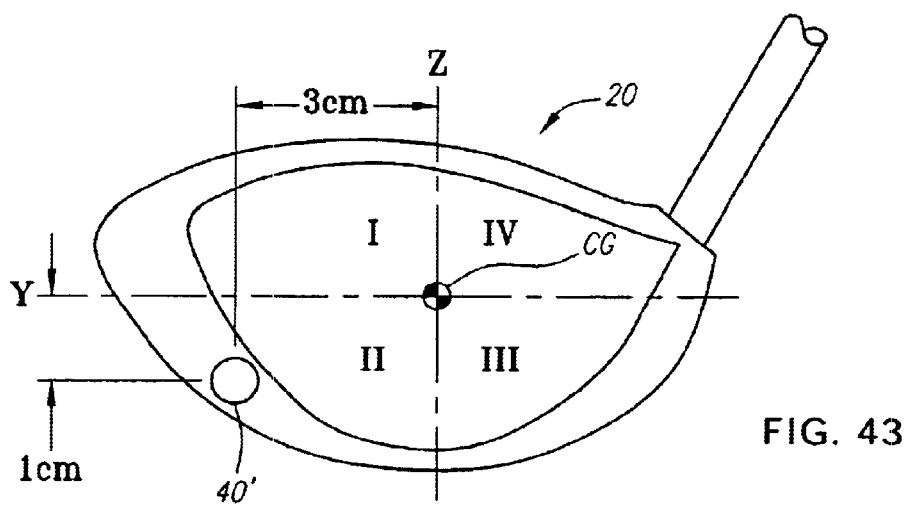
FIG. 43 is a front view of the golf club of the present invention partitioned into four quadrants by the Y axis and the Z axis through the center of gravity, with a weight member positioned in quadrant II.

A second example is shown in FIG. 43 wherein the five gram weight member 40' is positioned at a location in quadrant II at three centimeters along the Y axis from the center of gravity and one centimeter along the Z axis below the center of gravity. Using the above formula, Iyz= §§mdydz, then Iyz=5 g*3 cm*-1 cm=-15 g-cm². As stated above, the precise effect of the weight member 40' on Iyz is determined by accounting for the finite size of the mass by integrating over the area of the weight member 40'.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head comprising:
   a body having a crown, a sole and a striking plate, the body having a hollow interior,
   wherein the golf club head has a moment of inertia, Izz, greater than 3000 g-cm² and a moment of inertia, Iyy, greater than 1900 g-cm², and each of the products of inertia, Ixy and Ixz, of the golf club head has an absolute value less than 100 g-cm², and the product of inertia, Iyz, is greater than 0 g-cm², wherein the moments of inertia and the products of inertia are defined by the vertical axis Z through the center of gravity of the golf club head, a horizontal axis Y through the center of gravity of the golf club head and substantially parallel to the striking plate, and a forward to rearward axis X through the center of gravity of the golf club head, the X axis, the Y axis and the Z axis are orthogonal to each other.

2. The golf club head according to claim 1 wherein the golf club head has a volume ranging from 300 cm³ to 600 cm³.

3. The golf club head according to claim 1 wherein product of inertia Iyz is less than 300 g-cm².

4. The golf club head according to claim 3 wherein the product of inertia Iyz ranges from 50 g-cm² to 300 g-cm².

5. The golf club head according to claim 1 wherein the body is composed of a plurality of layers of plies of pre-preg material.

6. The golf club head according to claim 5 further comprising at least one weight strip composed of a material selected from the group consisting of a densified loaded film, copper, tungsten, and bismuth.

7. The golf club head according to claim 1 wherein the body is composed of a material selected from the group consisting of titanium, titanium alloy, steel, stainless steel, and amorphous metals.

8. The golf club head according to claim 7 wherein the striking plate has regions of varying thickness.

9. The golf club head according to claim 7 further comprising a plurality of weight members, the plurality of weight members having a total mass of less than 85 g.

10. The golf club head according to claim 9 wherein the body is composed of a titanium alloy material, the body having a mass less than 250 g.

11. The golf club head according to claim 1 wherein the product of inertia, Ixy, has an absolute value less than 50 g-cm².

12. A golf club head comprising:
    a body having a crown, a sole, a ribbon and a striking plate, the body having a hollow interior, the body composed of a material selected from the group consisting of titanium, titanium alloy, steel, stainless steel, and amorphous metals; and
    at least one weight member disposed within the hollow interior of the body along the ribbon,
    wherein the golf club head has a volume ranging from 300 cm³ to 600 cm³, a moment of inertia, Izz, that ranges from 3000 g-cm² to 5000 g-cm², and a moment of inertia, Iyy, of at least 1900 g-cm², and each of the products of inertia, Ixy and Ixz, of the golf club head has an absolute value less than 100 g-cm², and the product of inertia, Iyz, of the golf club head ranges from 0 g-cm² to 300 g-cm², wherein the moments of inertia and the products of inertia are defined by the vertical axis Z through the center of gravity of the golf club head, a horizontal axis Y through the center of gravity of the golf club head and substantially parallel to the striking plate, and a forward to rearward axis X through the center of gravity of the golf club head, the X axis, the Y axis and the Z axis are orthogonal to each other.

13. The golf club head according to claim 12 wherein the striking plate has regions of varying thickness.

14. The golf club head according to claim 12 wherein the plurality of weight members have a total mass of less than 85 g.

15. The golf club head according to claim 12 wherein the body is composed of a titanium alloy material, the body having a mass less than 250 g.

16. The golf club head according to claim 12 wherein the product of inertia, Ixy, has an absolute value less than 50 g-cm².

17. The golf club head according to claim 12 wherein a plurality of weight members are disposed within the hollow interior of the body along the ribbon.

* * * * *